(12) United States Patent
Rao et al.

(10) Patent No.: US 11,662,846 B2
(45) Date of Patent: *May 30, 2023

(54) TOUCH CIRCUIT AND DRIVING METHOD THEREOF, AND DRIVING SYSTEM FOR A TOUCH DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Yang Rao, Beijing (CN); Cheng Zuo, Beijing (CN); Dayu Zhang, Beijing (CN); Kangpeng Dang, Beijing (CN); Hong Chen, Beijing (CN); Peng Qin, Beijing (CN); Zhong Jin, Beijing (CN); Bo Wang, Beijing (CN); Zhongli Luo, Beijing (CN); Xiong Guo, Beijing (CN); Shifei Huang, Beijing (CN); Teng Liu, Beijing (CN); Yuansheng Tang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,874

(22) Filed: Aug. 26, 2021

(65) Prior Publication Data

US 2021/0389836 A1    Dec. 16, 2021

Related U.S. Application Data

(63) Continuation-in-part of application No. 16/882,098, filed on May 22, 2020, now Pat. No. 11,132,080.

(30) Foreign Application Priority Data

Sep. 26, 2019    (CN) .................... 201910918782.X

(51) Int. Cl.
*G06F 3/041*    (2006.01)

(52) U.S. Cl.
CPC .......... *G06F 3/0412* (2013.01); *G06F 3/0418* (2013.01); *G06F 3/04164* (2019.05)

(58) Field of Classification Search
CPC .. G06F 3/0412; G06F 3/0416; G06F 3/04164; G06F 3/0418
See application file for complete search history.

(56) References Cited

U.S. PATENT DOCUMENTS

| 2013/0285943 | A1 | 10/2013 | Kuo et al. |
| 2014/0244874 | A1 | 8/2014 | Erickson et al. |

(Continued)

FOREIGN PATENT DOCUMENTS

| CN | 105260680 A | 1/2016 |
| CN | 206322145 U | 7/2017 |

(Continued)

OTHER PUBLICATIONS

Notice of Allowance for corresponding U.S. Appl. No. 16/882,098, dated May 26, 2021, 7 pages.

(Continued)

*Primary Examiner* — Hong Zhou
(74) *Attorney, Agent, or Firm* — Dority & Manning, PA

(57) ABSTRACT

A touch circuit includes a touch IC and a logic sub-circuit. The touch IC includes a touch signal port. The logic sub-circuit is connected to the touch signal port, and is configured to transmit a touch enabling signal to the touch signal port. The logic sub-circuit includes an AND gate. The AND gate includes a first input terminal, a second input terminal and an output terminal electrically connected to the touch (Continued)

signal port. The AND gate is configured to output the touch enabling signal through the output terminal electrically connected to the touch signal port in response to receiving one of a backlight turn-on signal and a screen turn-on signal through the first input terminal, and a touch generation signal through the second input terminal.

20 Claims, 13 Drawing Sheets

(56) References Cited

U.S. PATENT DOCUMENTS

| | | | |
|---|---|---|---|
| 2014/0327631 A1 | 11/2014 | Park et al. | |
| 2015/0100713 A1 | 4/2015 | Sengoku | |
| 2015/0309650 A1 | 10/2015 | Ahmed et al. | |
| 2016/0147371 A1* | 5/2016 | Jin | G06F 3/04883 345/173 |
| 2017/0108970 A1* | 4/2017 | Kim | G06F 3/0446 |
| 2017/0109545 A1 | 4/2017 | Yamamoto et al. | |
| 2018/0113346 A1 | 4/2018 | Han et al. | |
| 2018/0173339 A1 | 6/2018 | Chu et al. | |
| 2019/0034378 A1 | 1/2019 | Suwald et al. | |
| 2019/0155776 A1 | 5/2019 | Miyama et al. | |
| 2019/0279600 A1* | 9/2019 | Chan | G06F 3/04166 |
| 2021/0089188 A1* | 3/2021 | Lin | G06F 3/0412 |

FOREIGN PATENT DOCUMENTS

| | | |
|---|---|---|
| JP | 2008016941 A | 1/2008 |
| JP | 4584199 | 11/2010 |

OTHER PUBLICATIONS

Non-Final Office Action for corresponding U.S. Appl. No. 16/882,098, dated Feb. 4, 2021, 16 pages.

Chinese First Office Action (w/ English translation) for corresponding Chinese Application No. 201910918782.X, dated Nov. 2, 2022, 18 pages.

* cited by examiner

TOUCH CIRCUIT AND DRIVING METHOD THEREOF, AND DRIVING SYSTEM FOR A TOUCH DISPLAY DEVICE

CROSS-REFERENCE TO RELATED APPLICATIONS

This application is a continuation-in-part of application Ser. No. 16/882,098, filed on May 22, 2020, which claims priority to Chinese Patent Application No. 201910918782.X, filed on Sep. 26, 2019, which are incorporated herein by reference in their entirety.

TECHNICAL FIELD

The present disclosure relates to the field of display technologies, and in particular, to a touch circuit and a driving method thereof, and a driving system for a touch display device.

BACKGROUND

At present, more and more display devices have a touch function to facilitate a user to perform touch operations and improve experiences of the user. The display device usually includes a system motherboard and a display panel control circuit board connected to the system motherboard, and the system motherboard cooperates with the display panel control circuit board to realize the touch function.

SUMMARY

In one aspect, a touch circuit is provided. The touch circuit includes a touch IC and a logic sub-circuit. The touch IC includes a touch signal port. The logic sub-circuit is electrically connected to the touch signal port, and is configured to output a touch enabling signal to the touch signal port. The logic sub-circuit includes an AND gate. The AND gate includes a first input terminal, a second input terminal and an output terminal electrically connected to the touch signal port. The AND gate is configured to output the touch enabling signal through the output terminal electrically connected to the touch signal port in response to receiving one of a backlight turn-on signal and a screen turn-on signal through the first input terminal, and a touch generation signal through the second input terminal.

In some embodiments, the AND gate further includes a third input terminal. The AND gate is configured to output the touch enabling signal through the output terminal electrically connected to the touch signal port in response to receiving one of the backlight turn-on signal and the screen turn-on signal through the first input terminal, the touch generation signal through the second input terminal, and another of the backlight turn-on signal and the screen turn-on signal through the third input terminal.

In some embodiments, the logic sub-circuit further includes a first resistor. A first electrode of the first resistor is configured to receive a control voltage, and a second electrode of the first resistor is electrically connected to the second input terminal of the AND gate.

In some embodiments, the logic sub-circuit further includes a second resistor and a third resistor. A first electrode of the second resistor is configured to receive one of the backlight turn-on signal and the screen turn-on signal, and a second electrode of the second resistor is electrically connected to the first input terminal of the AND gate. A first electrode of the third resistor is configured to receive the touch generation signal, and a second electrode of the third resistor is electrically connected to the second input terminal of the AND gate.

In some embodiments, the touch IC further includes a data signal port and a clock signal port. The touch circuit further includes a first switching sub-circuit and a second switching sub-circuit. The first switching sub-circuit is electrically connected to the data signal port, a first signal input terminal and a data signal input terminal. The second switching sub-circuit is electrically connected to the clock signal port, the first signal input terminal and a clock signal input terminal. The first switching sub-circuit is configured to transmit a signal from the data signal input terminal to the data signal port under control of the signal from the first signal input terminal. The second switching sub-circuit is configured to transmit a signal from the clock signal input terminal to the clock signal port under control of the signal from the first signal input terminal.

In some embodiments, the first switching sub-circuit includes a first transistor. A gate of the first transistor is electrically connected to the first signal input terminal, a first electrode of the first transistor is electrically connected to the data signal port, and a second electrode of the first transistor is electrically connected to the data signal input terminal.

In some embodiments, the second switching sub-circuit includes a second transistor. A gate of the second transistor is electrically connected to the first signal input terminal, a first electrode of the second transistor is electrically connected to the clock signal port, and a second electrode of the second transistor is electrically connected to the clock signal input terminal.

In some embodiments, the touch IC further includes a data signal port and a clock signal port; the touch circuit further includes a first pull-up sub-circuit and a second pull-up sub-circuit. The first pull-up sub-circuit is electrically connected to a first signal input terminal and the data signal port, and the first pull-up sub-circuit is configured to transmit a signal from the first signal input terminal to the data signal port The second pull-up sub-circuit is electrically connected to the first signal input terminal and the clock signal port, and the second pull-up sub-circuit is configured to transmit the signal from the first signal input terminal to the clock signal port.

In some embodiments, the first pull-up sub-circuit includes a first pull-up resistor. A first electrode of the first pull-up resistor is electrically connected to the first signal input terminal, and a second electrode of the first pull-up resistor is electrically connected to the data signal port of the touch IC.

In some embodiments, the second pull-up sub-circuit includes a second pull-up resistor. A first electrode of the second pull-up resistor is electrically connected to the first signal input terminal, and a second electrode of the second pull-up resistor is electrically connected to the clock signal port.

In another aspect, a driving system for a touch display device is provided. The driving system includes a display panel control circuit board including the touch circuit, and a system motherboard including a processor. The touch circuit includes a touch IC and a logic sub-circuit, the touch IC includes a touch signal port, and the logic sub-circuit includes an AND gate. A first input terminal of the AND gate is electrically connected to the processor through a first signal line, a second input terminal of the AND gate is electrically connected to the processor through a second signal line, and an output terminal of the AND gate is connected to the touch signal port of the touch IC. The processor is configured to output one of a backlight turn-on signal and a screen turn-on signal to the first input terminal of the AND gate through the first signal line, and output a touch generation signal to the second input terminal of the AND gate through the second signal line. The AND gate is configured to output the touch enabling signal through the output terminal electrically connected to the touch signal port of the touch IC in response to receiving one of the backlight turn-on signal and the screen turn-on signal through the first input terminal, and the touch generation signal through the second input terminal.

In some embodiments, the AND gate further includes a third input terminal electrically connected to the processor through a third signal line. The processor is configured to output another of the the backlight turn-on signal and the screen turn-on signal to the third input terminal of the AND gate through the third signal line, The AND gate is configured to output the touch enabling signal through the output terminal electrically connected to the touch signal port in response to receiving one of the backlight turn-on signal and the screen turn-on signal through the first input terminal, the touch generation signal through the second input terminal, and another of the backlight turn-on signal and the screen turn-on signal through the third input terminal.

In some embodiments, the touch circuit further includes a first switching sub-circuit electrically connected to the touch IC and a data signal input terminal, and a second switching sub-circuit electrically connected to the touch IC and a clock signal input terminal. The processor is electrically connected to the data signal input terminal through a data signal line, and is electrically connected to the clock signal input terminal through a clock signal line; and the processor is configured to output a data signal to the first switching sub-circuit in the touch circuit through the data signal line, so that the first switching sub-circuit transmits the data signal to the touch IC; and output a clock signal to the second switching sub-circuit through the clock signal line, so that the second switching sub-circuit transmits the clock signal to the touch IC.

In some embodiments, the system motherboard further includes a first level shift sub-circuit and a second level shift sub-circuit. The first level shift sub-circuit is electrically connected to the data signal line, a second signal input terminal, a third signal input terminal and the data signal input terminal of the touch circuit. The first level shift sub-circuit is configured to transmit a signal from the data signal line to the data signal input terminal of the touch circuit under control of both a signal from the second signal input terminal and a signal from the third signal input terminal, and the first level shift sub-circuit is configured to receive a signal from the first switching sub-circuit in the touch circuit. The second level shift sub-circuit is electrically connected to the clock signal line, the second signal input terminal, the third signal input terminal and the clock signal input terminal of the touch circuit. The second level shift sub-circuit is configured to transmit a signal from the clock signal line to the clock signal input terminal of the touch circuit under control of both the signal from the second signal input terminal and the signal from the third signal input terminal, and the second level shift sub-circuit is configured to receive a signal from the second switching sub-circuit in the touch circuit.

In some embodiments, the first level shift sub-circuit includes a third pull-up resistor, a third transistor and a fourth transistor. A first electrode of the third pull-up resistor is electrically connected to the second signal input terminal, and a second electrode of the third pull-up resistor is electrically connected to the data signal line and a first electrode of the third transistor. A gate of the third transistor is electrically connected to the second signal input terminal, and a second electrode of the third transistor is electrically connected to a second electrode of the fourth transistor. A date of the fourth transistor is electrically connected to the third signal input terminal, and a first electrode of the fourth transistor is electrically connected to the first switching sub-circuit in the touch circuit.

In some embodiments, the second level shift sub-circuit includes a fourth pull-up resistor, a fifth transistor and a sixth transistor. A first electrode of the fourth pull-up resistor is electrically connected to the second signal input terminal, and a second electrode of the fourth pull-up resistor is electrically connected to the clock signal line and a first electrode of the fifth transistor. A gate of the fifth transistor is electrically connected to the second signal input terminal, and a second electrode of the fifth transistor is electrically connected to a second electrode of the sixth transistor. A gate of the sixth transistor is electrically connected to the third signal input terminal, and a first electrode of the sixth transistor is electrically connected to the second switching sub-circuit in the touch circuit.

In yet another aspect, a driving method of a touch circuit is provided. The touch circuit is the touch circuit according to any of the above embodiments. The driving method includes outputting, by the logic sub-circuit, the touch enabling signal to the touch signal port in response to a touch operation, so as to activate the touch signal port. Outputting, by the logic sub-circuit, the touch enabling signal in response to the touch operation includes: outputting, by the AND gate, the touch enabling signal through the output terminal in response to receiving the touch generation signal through the second input terminal, and one of the backlight turn-on signal and the screen turn-on signal through the first input terminal.

In some embodiments, the AND gate further includes a third input terminal; and outputting, by the logic sub-circuit, the touch enabling signal in response to the touch operation includes: outputting, by the AND gate, the touch enabling signal through the output terminal in response to receiving the touch generation signal through the second input terminal, one of the backlight turn-on signal and the screen turn-on signal through the first input terminal, and another of the backlight turn-on signal and the screen turn-on signal through the third input terminal.

In some embodiments, the touch IC includes a data signal port and a clock signal port; the touch circuit includes a first switching sub-circuit and a second switching sub-circuit; the first switching sub-circuit is electrically connected to the data port, a first signal input terminal and a data signal input terminal; the second switching sub-circuit is electrically connected to the clock signal port, the first signal input terminal and a clock signal input terminal; and the driving method further includes: receiving, by the first signal input terminal, a signal; transmitting, by the first switching sub-circuit, a signal from the data signal input terminal to the data signal port under control of the signal from the first signal input terminal; and transmitting, by the second switching sub-circuit, a signal from the clock signal input terminal to the clock signal port under control of the signal from the first signal input terminal.

In some embodiments, the touch IC further includes a data signal port and a clock signal port; the touch circuit further includes a first pull-up sub-circuit electrically connected to a first signal input terminal and the data signal port, and a second pull-up sub-circuit electrically connected to the first signal input terminal and the clock signal port; and the driving method further includes: receiving, by the first signal input terminal, a signal; transmitting, by the first pull-up sub-circuit, the signal from the first signal input terminal to the data signal port, so as to activate the data signal port; and transmitting, by the second pull-up sub-circuit, the signal from the first signal input terminal to the dock signal port, so as to activate the dock signal port.

BRIEF DESCRIPTION OF THE DRAWINGS

In order to describe technical solutions in embodiments of the present disclosure more clearly, the accompanying drawings to be used in the description of the embodiments will be introduced briefly. However, the accompanying drawings to be described below are merely some embodiments of the present disclosure, and a person of ordinary skill in the art may obtain other drawings according to these drawings without paying any creative effort.

DETAILED DESCRIPTION

Figure 1:
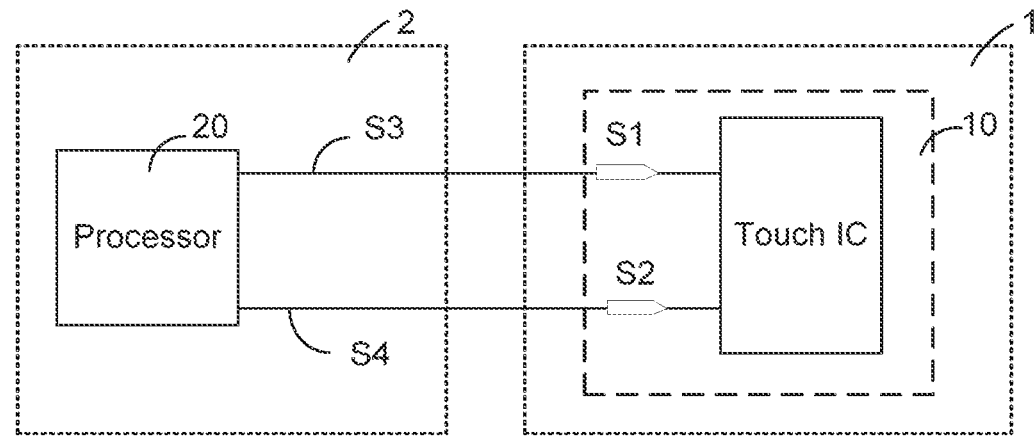
FIG. 1 is a schematic diagram showing a structure of a driving system for a touch display device, according to some embodiments.

The technical solutions in embodiments of the present disclosure will be described clearly and completely in combination with the accompanying drawings in the embodiments of the present disclosure. However, the described embodiments are merely some but not all of the embodiments of the present disclosure. All other embodiments obtained on a basis of the embodiments of the present disclosure by a person of ordinary skill in the art without paying any creative effort shall be included in the protection scope of the present disclosure.

Unless the context requires otherwise, the term "comprise" and other forms thereof such as the third-person singular form "comprises" and the present participle form "comprising" in the description and the claims are construed as open and inclusive meaning, i.e., "include, but not limited to". In the description of the description, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials or characteristics may be included in any one or more embodiment(s) or example(s) in any suitable manner.

As following, the terms "first" and "second" are used for descriptive purposes only and are not to be construed as indicating or implying the relative importance or implicitly indicating the number of indicated technical features. Thus, features defined as "first" or "second" may explicitly or implicitly include one or more of the features. In the description of the embodiments of the present disclosure, the term "a/the plurality of" means two or more unless otherwise specified.

In the description of some embodiments, the term such as "connect" and its extensions may be used. For example, the term "connect" may be used in the description of some embodiments to indicate that two or more components are in direct physical or electrical contact with each other. The embodiments disclosed herein are not necessarily limited to the contents herein. The use of "suitable for" or "configured to" in the document means open-ended and inclusive language, which does not exclude devices that are suitable for or configured to perform additional tasks or steps.

In the touch display device, during communication between the system motherboard and the display panel control circuit board, in a case where timings of signals from the system motherboard are unstable, the communication between the display panel control circuit board and the system motherboard is prone to be abnormal. For example, a failure of the touch function of the touch display device is caused. In addition, when the touch display device is in a sleep state, the touch function of the touch display device is usually available. In this case, when the touch display device is closed and in the sleep state, the keyboard may contact the display screen, thereby causing an abnormal touch of the touch display device due to false touches.

Some embodiments of the present disclosure provide a touch display device having display and touch functions, such as, a mobile phone, a tablet computer, or a notebook computer. The following embodiments are described by taking the notebook computer as an example, but the structures described below are also suitable for other touch display devices.

The touch display device includes a driving system, and as shown in FIG. 1, the driving system includes a display panel control circuit board 1 and a system motherboard 2.

In some examples, the display panel control circuit board 1 is electrically connected to a display panel of the touch display device. The display panel is a single layer on cell (SLOG) touch display panel.

For example, the display panel control circuit board 1 includes a touch circuit 10. The touch circuit 10 can communicate with the system motherboard 2 through, for example, an inter-integrated circuit (I2C) protocol.

In some examples, as shown in FIG. 1, the system motherboard 2 includes a processor 20. The processor 20 is electrically connected to a data signal input terminal S1 of the touch circuit 10 through a data signal line S3, and is electrically connected to a clock signal input terminal S2 of the touch circuit 10 through a clock signal line 54.

The processor 20 is configured to output data signals to the touch circuit 10 through the data signal line S3, and output clock signals to the touch circuit 10 through the clock signal line S4. Of course, the processor 20 may also receive signals from the touch circuit 10 through the data signal line S3 and the clock signal line S4, thereby achieving communication between the processor 20 and the touch circuit 10.

Herein, the processor 20 may be a central processing unit (CPU), a microprocessor, an application-specific integrated circuit (ASIC), etc.

Figure 2:
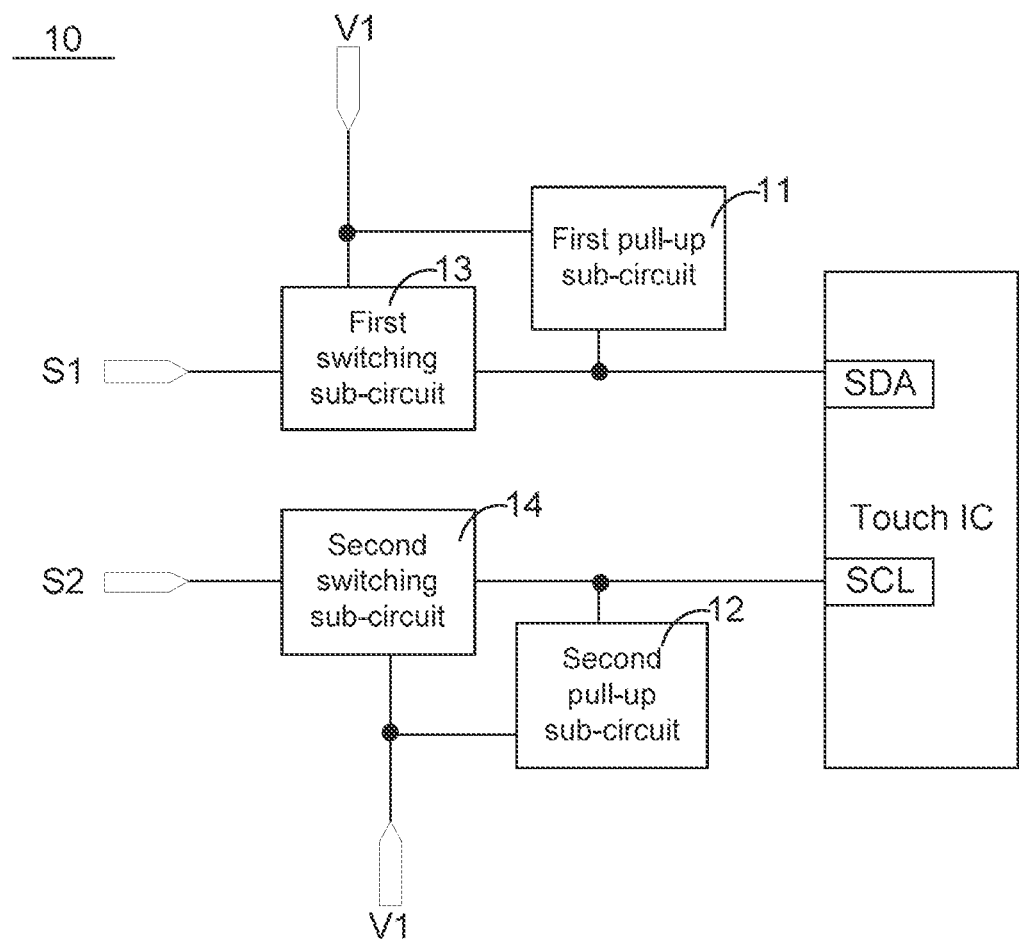
FIG. 2 is a schematic diagram showing a structure of a touch circuit, according to some embodiments.

In some embodiments, as shown in FIG. 2, the touch circuit 10 includes a first pull-up sub-circuit 11, a second pull-up sub-circuit 12, a first switching sub-circuit 13, a second switching sub-circuit 14 and a touch integrated circuit (IC). The touch IC includes a data signal port SDA and a clock signal port SCL.

The first pull-up sub-circuit 11 is electrically connected to a first signal input terminal V1 and the data signal port SDA of the touch IC. The first pull-up sub-circuit 11 is configured to transmit a signal from the first signal input terminal V1 to the data signal port SDA of the touch IC, so as to activate the data signal port SDA.

The first switching sub-circuit 13 is electrically connected to the data signal port SDA, the first signal input terminal V1, and the data signal input terminal S1. The first switching sub-circuit 13 is configured to transmit a signal from the data signal input terminal S1 to the data signal port SDA of the touch IC under control of the signal from the first signal input terminal V1.

The second pull-up sub-circuit 12 is electrically connected to the first signal input terminal V1 and the clock signal port SCL of the touch IC. The second pull-up sub-circuit 12 is configured to transmit the signal from the first signal input terminal V1 to the clock signal port SCL of the touch IC, so as to activate the clock signal port SCL.

The second switching sub-circuit 14 is electrically connected to the clock signal port SCL of the touch IC, the first signal input terminal V1 and the clock signal input terminal S2. The second switching sub-circuit 14 is configured to transmit a signal from the clock signal input terminal S2 to the clock signal port SCL of the touch IC under control of the signal from the first signal input terminal V1.

It will be noted that, the signal from the first signal input terminal V1 is an effective control signal required for activating the touch IC. That is, only when the signal from the first signal input terminal V1 reaches the touch IC and activates the data signal port SDA and the clock signal port SOL, may the touch IC work normally.

The signals from the first signal input terminal V1, the data signal input terminal S1 and the clock signal input terminal S2 can all be at a high level. Moreover, during a process of activating the touch IC, a voltage level of the signal from the first signal input terminal V1 can be higher than a voltage level of the signal from the data signal input terminal S1 and a voltage level of the signal from the clock signal input terminal S2.

Accordingly, a driving method of the touch circuit 10 includes: receiving, by the first signal input terminal V1, a signal. In this case, the first pull-up sub-circuit 11 transmits the signal from the first signal input terminal V1 to the data signal port SDA of the touch IC, so as to activate the data signal port SDA of the touch IC, and the first switching sub-circuit 13 transmits the signal from the data signal input terminal S1 to the data signal port SDA of the touch IC under control of the signal from the first signal input terminal V1. In addition, the second pull-up sub-circuit 12 transmits the signal from the first signal input terminal V1 to the clock signal port SCL of the touch IC, so as to activate the clock signal port SLC of the touch IC, and the second switching sub-circuit 14 transmits the signal from the clock signal input terminal S2 to the clock signal port SCL of the touch IC under control of the signal from the first signal input terminal V1.

It will be understood that, if there is no first switching sub-circuit 13 in the touch circuit 10, the signal from the data signal input terminal S1 and the signal from the clock signal input terminal S2 usually reach the touch IC earlier than the signal from the first signal input terminal V1. For example, a time difference t between time at which the signal from the data signal input terminal S1 reaches the touch IC (or time at which the signal from the clock signal input terminal 32 reaches the touch IC) and time at which the signal from the first signal input terminal V1 reaches the touch IC is in a range of approximately 1 ms to approximately 3 ms, and the signal from the data signal input terminal S1 and the signal from the clock signal input terminal S2 may activate the touch IC, which may cause the components inside the touch IC work abnormally.

However, in some embodiments of the present disclosure, when the signal from the data signal input terminal S1 reaches the first switching sub-circuit 13, the signal from the first signal input terminal V1 has not yet reached the first switching sub-circuit 13. In this case, the first switching sub-circuit 13 is in a turn-off state, and can not transmit the signal from the data signal input terminal S1 to the data signal port SDA of the touch IC. Therefore, it is possible to prevent the signal from the data signal input terminal S1 from entering the touch IC in advance, and the components inside the touch IC will not work abnormally.

Then, when the signal from the first signal input terminal V1 reaches the first switching sub-circuit 13, the first switching sub-circuit 13 is turned on under control of the signal from the first signal input terminal V1 and transmits the signal from the data signal input terminal S1 to the data signal port SDA of the touch IC. Meanwhile, the first pull-up sub-circuit 11 transmits the signal from the first signal input terminal V1 to the data signal port SDA of the touch IC. Since the voltage level of the signal from the first signal input terminal V1 is higher than the voltage level of the signal from the data signal input terminal S1, the voltage at the data signal port SDA of the touch IC is the same as the voltage of the signal from the first signal input terminal V1, and a normal communication of the data signals in the touch IC is started.

Correspondingly, when the signal from the clock signal input terminal S2 reaches the second switching sub-circuit 14, the signal from the first signal input terminal V1 has not yet reached the second switching sub-circuit 14. In this case, the second switching sub-circuit 14 is in a turn-off state, and can not transmit the signal from the clock signal input terminal S2 to the clock signal port SCL of the touch IC. Therefore, it is possible to prevent the signal from the clock signal input terminal S2 from entering the touch IC in advance, and the components inside the touch IC will not work abnormally.

Then, when the signal from the first signal input terminal V1 reaches the second switching sub-circuit 14, the second switching sub-circuit 14 is turned on under control of the signal from the first signal input terminal V1 and transmits the signal from the clock signal input terminal S2 to the data signal port SDA of the touch IC. Meanwhile, the second pull-up sub-circuit 12 transmits the signal from the first signal input terminal V1 to the clock signal port SCL of the touch IC. Since the voltage level of the signal from the first signal input terminal V1 is higher than the voltage level of the signal from the clock signal input terminal 32, a voltage at the clock signal port SCL of the touch IC is the same as the voltage of the signal from the first signal input terminal V1, and a normal communication of the clock signals in the touch IC is started.

In other words, in the touch circuit 10, when the signal from the data signal input terminal S1 reaches the first switching sub-circuit 13, the signal from the first signal input terminal V1 has not yet reached the first switching sub-circuit 13, and thus the first switching sub-circuit 13 is in the turn-off state, and can not transmit the signal from the data signal input terminal 31 to the data signal port SDA of the touch IC. Therefore, it is possible to prevent the signal from the data signal input S1 from entering the touch IC in advance, thereby preventing the signal from affecting the normal operations of the components inside the touch IC. Then, the signal from the first signal input terminal V1 reaches the first switching sub-circuit 13 to control the first switching sub-circuit 13 to turn on, and in the meantime, the first pull-up sub-circuit 11 transmits the signal from the first signal input terminal V1 to the data signal port SDA of the touch IC to start the normal communication of the data signals in the touch IC, and an abnormal touch function may be avoided.

Similarly, when the signal from the clock signal input terminal S2 reaches the second switching sub-circuit 14, the signal from the first signal input terminal V1 has not yet reached the second switching sub-circuit 14, and thus the second switching sub-circuit 14 is in the turn-off state, and can not transmit the signal from the clock signal input terminal 32 to the clock signal port SCL of the touch IC. Therefore, it is possible to prevent the signal from the clock signal input terminal 32 from entering the touch IC in advance, thereby preventing the signal from affecting the normal operations of the components inside the touch IC. Then, the signal from the first signal input terminal V1 reaches the second switching sub-circuit 14 to control the second switching sub-circuit 14 to turn on, and in the meantime, the second pull-up sub-circuit 12 transmits the signal from the first signal input terminal V1 to the clock signal port SCL of the touch IC to start the normal communication of the clock signals in the touch IC, and the abnormal touch function may be avoided.

Figure 3:
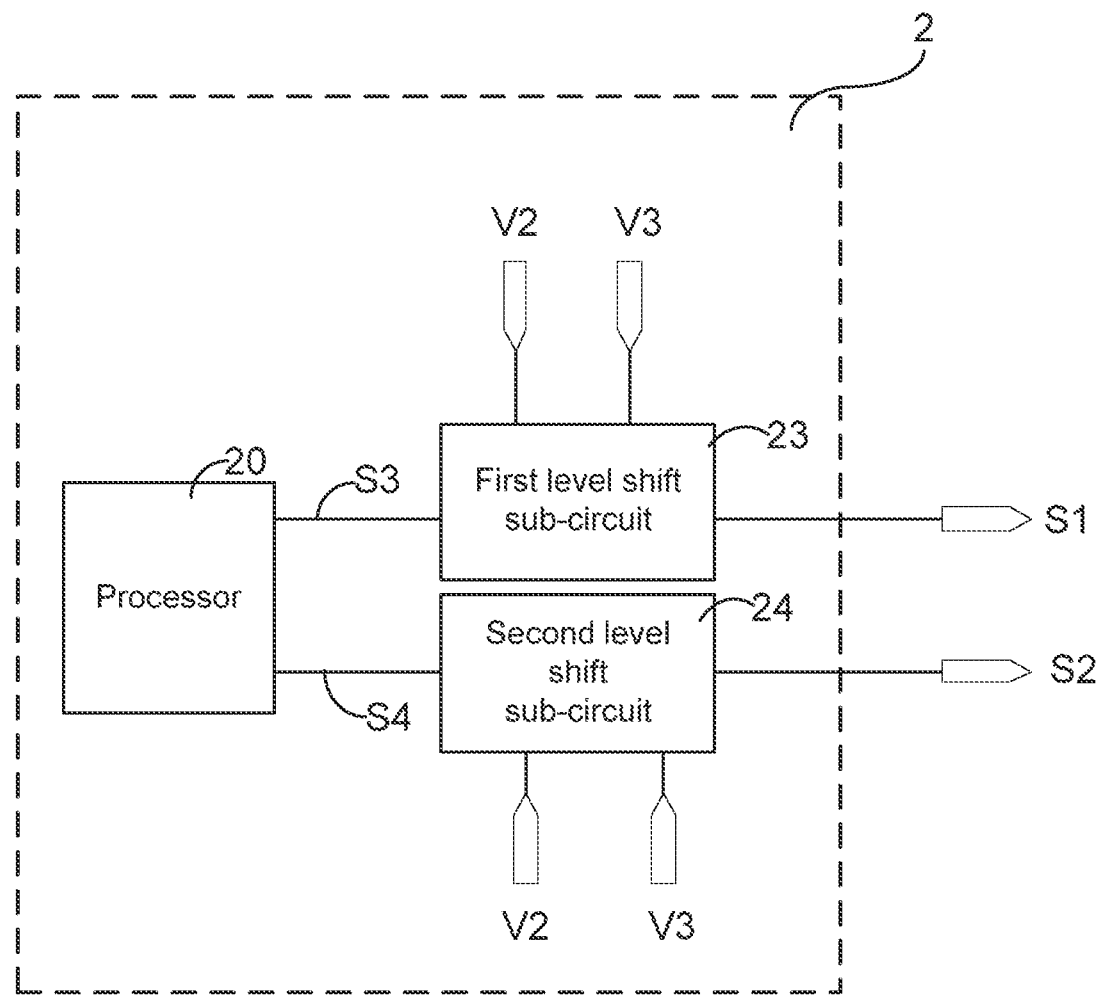
FIG. 3 is a schematic diagram showing a structure of a system motherboard, according to some embodiments.

In some embodiments, as shown in FIG. 3, the system motherboard 2 includes a first level shift sub-circuit 23 and a second level shift sub-circuit 24 that are connected to the processor 20.

The first level shift sub-circuit 23 is electrically connected to the data signal line S3, a second signal input terminal V2, a third signal input terminal V3 and the data signal input terminal S1 in the touch circuit 10. The first level shift sub-circuit 23 is configured to transmit a signal from the data signal line S3 to the data signal input terminal S1 in the touch circuit 10 under control of both a signal from the second signal input terminal V2 and a signal from the third signal input terminal V3, and the first level shift sub-circuit 23 is configured to receive a signal from the first switching sub-circuit 13 in the touch circuit 10.

The second level shift sub-circuit 24 is electrically connected to the clock signal line S4, the second signal input terminal V2, the third signal input terminal V3 and the clock signal input terminal S2 in the touch circuit 10. The second level shift sub-circuit 24 is configured to transmit a signal from the clock signal line S4 to the clock signal input terminal S2 in the touch circuit 10 under control of both the signal from the second signal input terminal V2 and the signal from the third signal input terminal V3, and the second level shift sub-circuit 24 is configured to receive a signal from the second switching sub-circuit 14 in the touch circuit 10.

As shown in FIGS. 2 and 3, the first switching sub-circuit 13 is electrically connected to the data signal port SDA of the touch IC and the first level shift sub-circuit 23, and when the first switching sub-circuit 13 is turned on, a voltage of the signal, which is received by the first level shift sub-circuit 23, from the first switching sub-circuit 13 is equal to a voltage at the data signal port SDA of the touch IC. In addition, the second switching sub-circuit 14 in the touch circuit 10 is electrically connected to the clock signal port SCL of the touch IC and second level shift sub-circuit 24, and when the second switching sub-circuit 14 is turned on, a voltage of the signal, which is received by the second level shift sub-circuit 24, from the second switching sub-circuit 14 is equal to a voltage at the clock signal port SCL, of the touch IC.

For example, the signals from the data signal line S3, the clock signal line S4, the second signal input terminal V2 and the third signal input terminal V3 are all at a high level. A voltage level of the signal from the data signal line S3, a voltage level of the signal from the clock signal line S4 and a voltage level of the signal from the second signal input terminal V2 are all lower than a voltage level of the signal from the third signal input terminal V3. Moreover, the voltage level of the signal from the third signal input terminal V3 is equal to the voltage level of the signal from the first signal input terminal V1.

For example, the voltage of the signal from the third signal input terminal V3 and the voltage of the signal from the first signal input terminal V1 have a same value range of approximately 3.3 V to approximately 3.6 V. The voltage of the signal from the second signal input terminal V2 is in a value range of approximately 1.65 V to approximately 1.95 V.

The display panel control circuit board 1 may further include at least one power supply IC disposed between the first pull-up sub-circuit 11 and the touch IC and between the second pull-up sub-circuit 12 and the touch IC. In this case, if the voltage of the signal from the first signal input terminal V1 is relatively high (e.g., 5 V), the power supply IC may convert the voltage that is relatively high (e.g., 5 V) to a voltage that is relatively low (e.g., 3.3 V), and then output the voltage that is relatively low to the touch IC.

It will be noted that, time at which the signal from the data signal line S3 reaches the first level shift sub-circuit 23 is the same as time at which the signal from the clock signal line S4 reaches the second level shift sub-circuit 24. Time at which the signal from the second signal input terminal V2 reaches the first level shift sub-circuit 23 is the same as time at which the signal from the second signal input terminal V2 reaches the second level shift sub-circuit 24. Time at which the signal from the third signal input terminal V3 reaches the first level shift sub-circuit 23 is the same as time at which the signal from the third signal input terminal V3 reaches the second level shift sub-circuit 24.

The system motherboard 2 and the display panel control circuit board 1 are electrically connected through the first level shift sub-circuit 23 and the second level shift sub-circuit 24. The first level shift sub-circuit 23 and the second level shift sub-circuit 24 may have level shift functions. In this way, during communication between the system motherboard 2 and the display panel control circuit board 1, a problem that it is difficult for the system motherboard 2 and the display panel control circuit board 1 to be directly electrically connected due to a potential mismatch may be avoided by utilizing the level shift functions of the first level shift sub-circuit 23 and the second level shift sub-circuit 24.

For example, the voltage of the signal from the data signal line S3 is generally lower than the voltage of the signal input to the first switching sub-circuit 13 or the voltage of the signal from the clock signal line S4 is generally lower than the voltage of the signal input to the second switching sub-circuit 14, and the voltage difference may make it difficult for the system motherboard 2 and the display panel control circuit board 1 to be normally electrically connected. However, in some embodiments of the present disclosure, by providing the first level shift sub-circuit 23 and the second level shift sub-circuit 24, the system motherboard 2 and the display panel control circuit board 1 may be normally electrically connected and work normally.

Structures of sub-circuits in the touch circuit 10 shown in FIG. 2 will be described in detail below.

Figure 4:
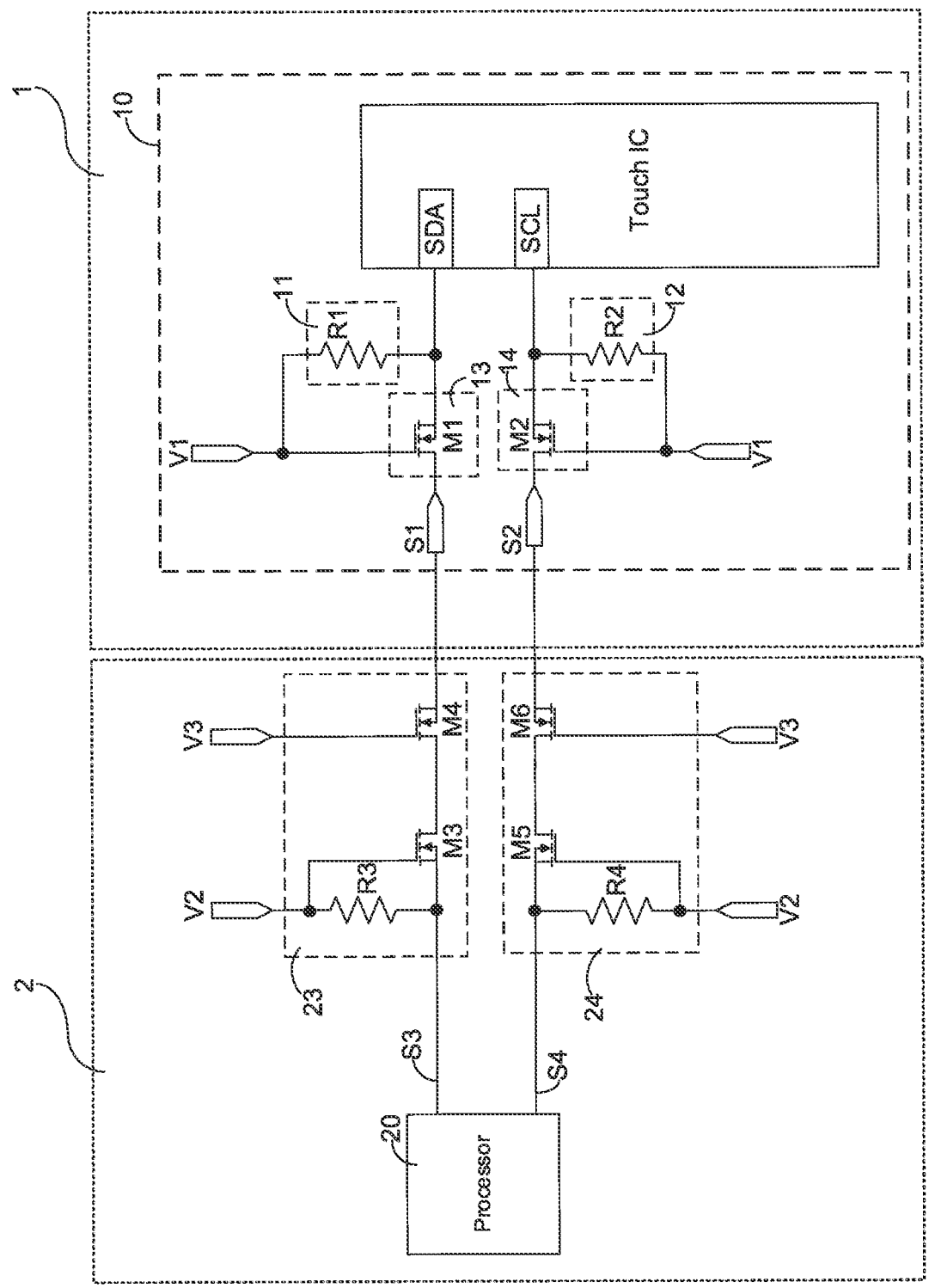
FIG. 4 is a schematic diagram showing a structure of another driving system for a touch display device, according to some embodiments.

In some embodiments, as shown in FIG. 4, the first switching sub-circuit 13 includes a first transistor M1. A gate of the first transistor M1 is electrically connected to the first signal input terminal V1, a first electrode of the first transistor M1 is electrically connected to the data signal port SDA of the touch IC, and a second electrode of the first transistor M1 is electrically connected to the data signal input terminal S1.

In some embodiments, as shown in FIG. 4, the second switching sub-circuit 14 includes a second transistor M2. A gate of the second transistor M2 is electrically connected to the first signal input terminal V1, a first electrode of the second transistor M2 is electrically connected to the clock signal port SCL of the touch IC, and a second electrode of the second transistor M2 is electrically connected to the clock signal input terminal S2.

In some examples, the first transistor M1 and the second transistor M2 are N-type transistors. For example, the N-type transistor can be an N-type metal oxide semiconductor field effect transistor (MOSFET) or can be an N-type thin film transistor (TFT). The types of the first and second transistors are not limited thereto, which can be set according to actual needs.

In some embodiments, as shown in FIG. 4, the first pull-up sub-circuit 11 includes a first pull-up resistor R1. A first electrode of the first pull-up resistor R1 is electrically connected to the first signal input terminal V1, and a second electrode of the first pull-up resistor R1 is electrically connected to the data signal port SDA of the touch IC.

In some embodiments, as shown in FIG. 4, the second pull-up sub-circuit 12 includes a second pull-up resistor R2. A first electrode of the second pull-up resistor R2 is electrically connected to the first signal input terminal V1, and a second electrode of the second pull-up resistor R2 is electrically connected to the clock signal port SOL of the touch IC.

In some examples, a resistance value of the second pull-up resistor R2 is equal to a resistance value of the first pull-up resistor R1.

Structures of the first level shift sub-circuit 23 and the second level shift sub-circuit 24 shown in FIG. 3 will be described in detail below.

In some embodiments, as shown in FIG. 4, the first level shift sub-circuit 23 includes a third pull-up resistor R3, a third transistor M3 and a fourth transistor M4. The third transistor M3 and the fourth transistor M4 are, for example, both N-type transistors.

A first electrode of the third pull-up resistor R3 is electrically connected to the second signal input terminal V2, and a second electrode of the third pull-up resistor R3 is electrically connected to the data signal line S3 and a first electrode of the third transistor M3.

A gate of the third transistor M3 is electrically connected to the second signal input terminal V2, and a second electrode of the third transistor M3 is electrically connected to a second electrode of the fourth transistor M4.

A gate of the fourth transistor M4 is electrically connected to the third signal input terminal V3, and a first electrode of the fourth transistor M4 is electrically connected to the first switching sub-circuit 13 in the touch circuit 10 via the data signal input terminal S1.

It will be noted that, in a case where the first pull-up sub-circuit 11 includes the first pull-up resistor R1, a resistance value of the third pull-up resistor R3 may be greater than the resistance value of the first pull-up resistor R1.

In this case, a signal transmission rate of the data signal line S3 may be controlled by adjusting the resistance values of the first pull-up resistor R1 and the third pull-up resistor R3.

In some embodiments, as shown in FIG. 4, the second level shift sub-circuit 24 includes a fourth pull-up resistor R4, a fifth transistor M5 and a sixth transistor M6. The fifth transistor M5 and the sixth transistor M6 are, for example, both N-type transistors.

A first electrode of the fourth pull-up resistor R4 is electrically connected to the second signal input terminal V2, and a second electrode of the fourth pull-up resistor R4 is electrically connected to the clock signal line S4 and a first electrode of the fifth transistor M5.

A gate of the fifth transistor M5 is electrically connected to the second signal input terminal V2, and a second electrode of the fifth transistor M5 is electrically connected to a second electrode of the sixth transistor M6.

A gate of the sixth transistor M6 is electrically connected to the third signal input terminal V3, and a first electrode of the sixth transistor M6 is electrically connected to the second switching sub-circuit 14 in the touch circuit 10 via the clock signal input terminal S2.

It will be noted that, in a case where the second pull-up sub-circuit 12 includes the second pull-up resistor R2, a resistance value of the fourth pull-up resistor R4 may be greater than the resistance value of the second pull-up resistor R2.

On this basis, a signal transmission rate of the clock signal line S4 may be controlled by adjusting the resistance values of the second pull-up resistor R2 and the fourth pull-up resistor R4.

In combination with signal timings shown in FIG. 5, operations of the touch circuit 10 in the display panel control circuit board 1, and the first level shift sub-circuit 23 and the second level shift sub-circuit 24 in the system motherboard 2 shown in FIG. 4 will be described in detail below.

Figure 5:
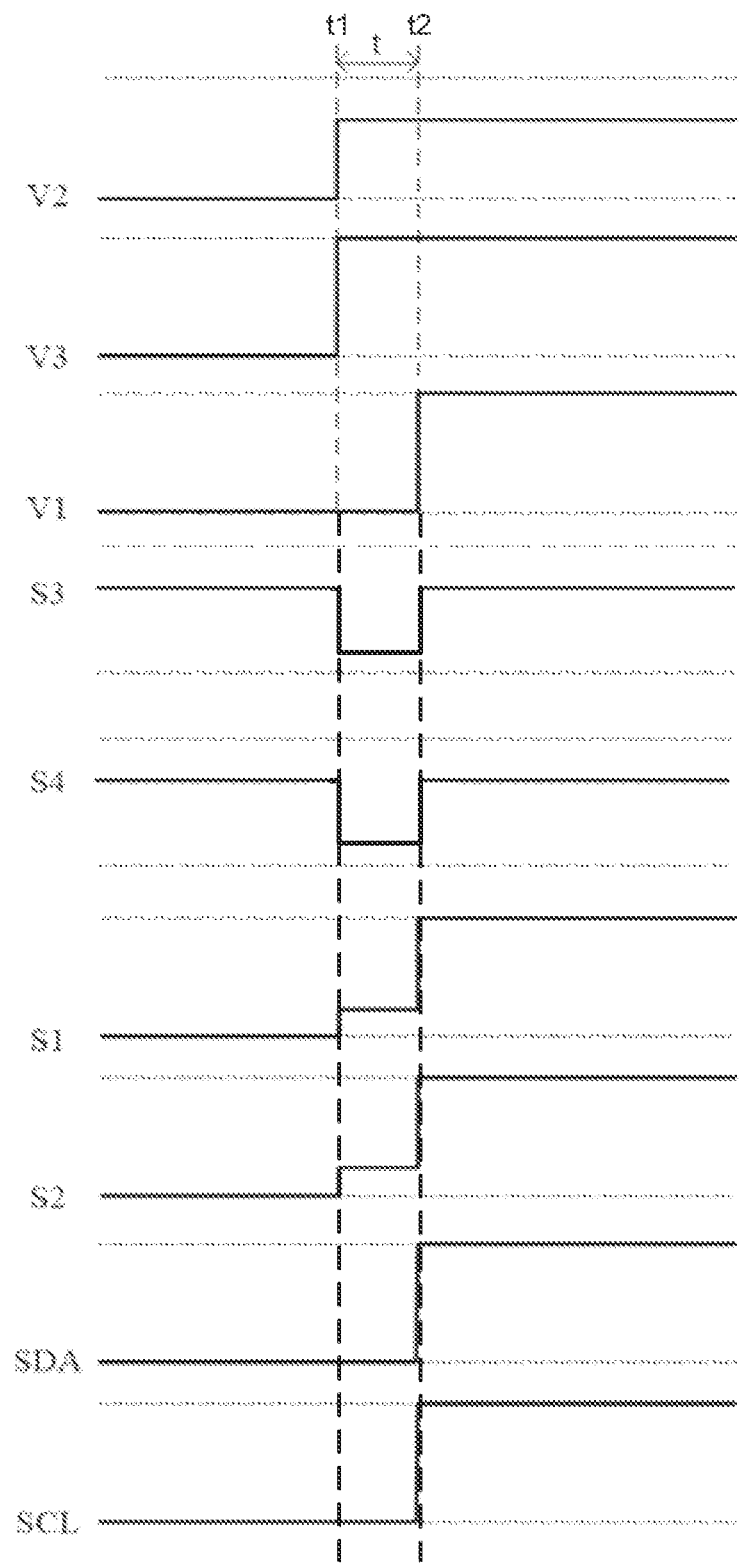
FIG. 5 is a timing diagram of signals for controlling the driving system in FIG. 4.

As shown in FIGS. 4 and 5, before the time point t1, the data signal line S3 transmits a high level signal, and the voltage of the signal received by the second signal input terminal V2 is the same as the voltage of the signal received by the data signal line S3. In this case, both the gate and the first electrode of the third transistor M3 in the first level shift sub-circuit 23 receive high level signals, and a voltage difference between the voltage at the gate of the third transistor M3 and the voltage at the first electrode of the third transistor M3 is 0, so that the third transistor M3 is turned off. In this case, a small current flows through the third pull-up resistor R3 under action of the signal from the second signal input terminal V2, and the small current flows through the third transistor M3, so that a leakage current is generated in the third transistor M3. The leakage current further flows to the second electrode of the fourth transistor M4 through a parasitic diode of the third transistor M3, and then a leakage current is generated in the fourth transistor M4 under the action of the leakage current from the third transistor M3.

In this case, as shown in FIG. 5, the third signal input terminal V3 and the second signal input terminal V2 are powered up simultaneously at the time point t1 The third signal terminal V3 transmits a high level signal to the gate of the fourth transistor M4, and the second signal input terminal V2 transmits another high level signal to the gate of the third transistor M3. The voltage of the high level signal transmitted by the third signal input terminal V3 is higher than the voltage of the high level signal transmitted by the second signal input terminal V2. In a case where a voltage difference between a voltage at the gate of the fourth transistor M4 and a voltage at the second electrode of the fourth transistor M4 is greater than or equal to a threshold voltage of the fourth transistor M4, the fourth transistor M4 is turned on and the leakage current from the third transistor M3 flows to the second electrode of the first transistor M1 through the data signal input terminal S1.

Herein, the term "power up" means that an electrical signal is input to a terminal at first during a turn-on process of the touch display device.

For example, the voltage of the signal transmitted by the data signal line S3 is approximately 1.8 V, the voltage of the signal received by the second signal input terminal V2 is approximately 1.8 V, and the voltage of the signal received by the third signal input terminal V3 is approximately 3.3 V. In this case, due to existence of the leakage current in the third transistor M3 and the leakage current in the fourth transistor M4, the voltage of the signal from the data signal line S3 is pulled down to approximately 0.5 V, and the voltage of the signal from the data signal input terminal S1 is pulled up to approximately 0.5 V.

The first signal input terminal V1 is powered up later than the second signal input terminal V2 and the third signal input terminal V3. For example, the voltage of the signal received by the first signal input terminal V1 is approximately 3.3 V. As shown in FIG. 5, a time difference between the power-up time of the signal from the second signal input terminal V2 (or the power-up time of the signal from the third signal input terminal V3) and the power-up time of the signal from the first signal input terminal V1 is t, so that the signal from the second signal input terminal V2 and the signal from the third signal input terminal V3 reach the first switching sub-circuit 13 earlier than the signal from the first signal input terminal V1. Therefore, when a leakage current reaches the second electrode of the first transistor M1 through the data signal input terminal S1, the signal from the first signal input terminal V1 has not reached the gate of the first transistor M1. In this case, a voltage across the gate and the second electrode of the first transistor M1 is less than a turn-on voltage of the first transistor M1, and the first transistor M1 is turned off, thereby preventing the leakage current from flowing to the data signal port SDA of the touch IC.

As shown in FIG. 5, the first signal input terminal V1 receives a high level signal at time point t2. The high level signal is then transmitted to the first transistor M1 to turn on the first transistor M1, and then the leakage current flows to the data signal port SDA of the touch IC. At the same time, the first pull-up resistor R1 transmits the high level signal from the first signal input terminal V1 to the data signal port SDA of the touch IC. Since the voltage of the signal from the first signal input terminal V1 is higher than a voltage of the leakage current, the leakage current does not affect a normal operation of the touch IC.

In addition, as shown in FIG. 5, the voltage of the signal from the first signal input terminal V1 is higher than each of the voltage of the signal from the second signal input terminal V2 and the voltage of the signal from the data signal line S3, so that a voltage of the leakage current in the fourth transistor M4 is also relatively high. Therefore, in a case where the third transistor M3 and the fourth transistor M4 in the first level shift sub-circuit 23 are connected in reverse series, it is possible to avoid damage to the processor 20 due to a fact that the leakage current with a high level flows to the processor 20.

Herein, the reverse series connection means that one electrode of one transistor is connected to the same electrode of another transistor with the same type. For example, the drain of the third transistor M3 is electrically connected to the drain of the fourth transistor M4.

Similarly, as shown in FIGS. 4 and 5, the clock signal line S4 transmits a high level signal, and the voltage of the signal received by the second signal input terminal V2 is the same as the voltage of the signal from the clock signal line S4. In this case, both the gate of the fifth transistor M5 and the first electrode of the fifth transistor M5 in the second level shift sub-circuit 24 receive high level signals. That is, a voltage across the gate and the first electrode of the fifth transistor M5 is 0, so that the fifth transistor M5 is turned off. In this case, a small current flows through the fourth pull-up resistor R4 under action of the signal from the second signal input terminal V2, and the small current flows through the fifth transistor M5, so that a leakage current is generated in the fifth transistor M5. The leakage current further flows to the second electrode of the sixth transistor MS through a parasitic diode of the fifth transistor M5, and then a leakage current is generated in the sixth transistor M6 under the action of the leakage current from the fifth transistor M5.

On this basis, as shown in FIG. 5, at the time point t1, the third signal input terminal V3 and the second signal input terminal V2 are powered up simultaneously, the third signal input terminal V3 transmits a high level signal to the gate of the sixth transistor M6, and the second signal input terminal V2 transmits another high level signal to the gate of the fifth transistor M5. The voltage of the signal transmitted by the third signal input terminal V3 is higher than the voltage of the signal transmitted by the second signal input terminal V2. In a case where a voltage across the gate and the second electrode of the sixth transistor M6 is greater than or equal to a threshold voltage of the sixth transistor M5, the sixth transistor MS is turned on, and the leakage current from the fifth transistor M5 flows to the second electrode of the second transistor M2 through the clock signal input terminal S2.

For example, the voltage of the signal transmitted by the clock signal line S4 is approximately 1.8 V, the voltage of the signal received by the second signal input terminal V2 is approximately 1.8 V, and the voltage of the signal received by the third signal input terminal V3 is approximately 3.3 V In this case, the leakage current in the fifth transistor M5 and the leakage current in the sixth transistor M6 are approximately 0.5 V, so that the voltage of the signal from the clock signal line S4 is pulled down to approximately 0.5 V, and the voltage of the signal from the clock signal input S2 is pulled up to approximately 0.5 V.

The first signal input terminal V1 is powered up later than the second signal input terminal V2 and the third signal input terminal V3. For example, the voltage of the signal received by the first signal input terminal V1 is approximately 3.3 V. Therefore, when a leakage current reaches the second electrode of the second transistor M2 through the data signal input terminal S2, the signal from the first signal input terminal V1 has not reached the gate of the second transistor M2. In this case, a voltage across the gate and the second electrode of the second transistor M2 is less than a turn-on voltage of the second transistor M2, and the second transistor M2 is turned off, thereby preventing the leakage current from flowing to the clock signal port SCL of the touch IC.

As shown in FIG. 5, the first signal input terminal V1 receives a high level signal at time point t2. The high level signal is transmitted to the second transistor M2 to turn on the second transistor M2, and then the leakage current flows to the clock signal port SCL of the touch IC. At the same time, the second pull-up resistor R2 transmits the high level signal from the first signal input terminal V1 to the clock signal port SCL of the touch IC. Since the voltage of the signal from the first signal input terminal V1 is higher than a voltage of the leakage current, the leakage current does not affect the normal operation of the touch IC.

In addition, the voltage of the signal from the first signal input terminal V1 is higher than each of the voltage of the signal from the second signal input terminal V2 and the voltage of the signal from the clock signal line S4, and thus a voltage of the leakage current in the sixth transistor M6 is also relatively high. Therefore, in a case where the fifth transistor M5 and the sixth transistor M6 in the second level shift sub-circuit 24 are connected in reverse series, it is possible to avoid damage to the processor 20 due to a fact that the leakage current with a high level flows to the processor 20.

In order to describe technical effects that may be achieved by the touch circuit 10 and the driving system in some embodiments of the present disclosure more clearly, the touch circuit 10 in some embodiments of the present disclosure is compared with a related touch circuit below.

Figure 6:
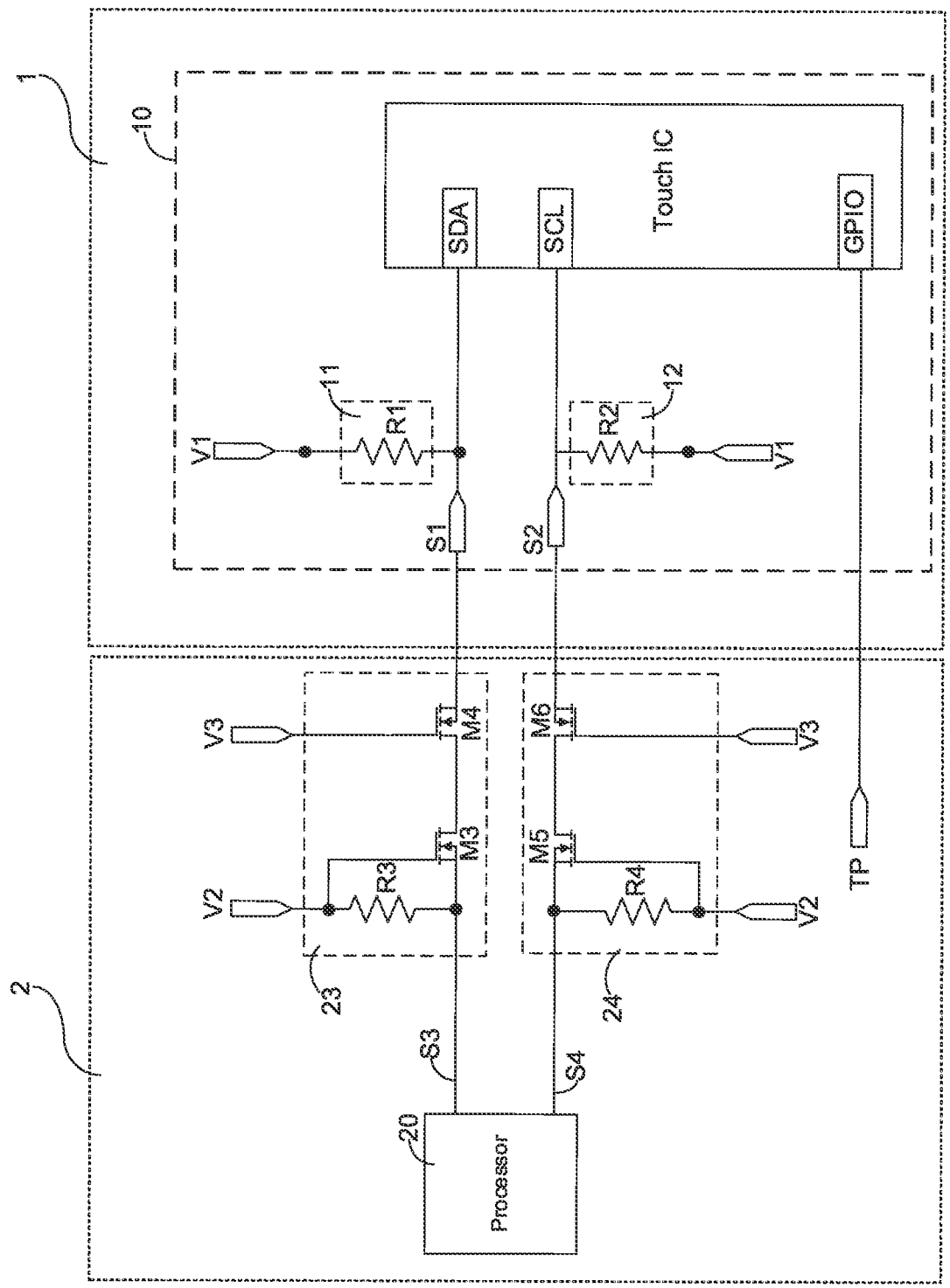
FIG. 6 is a schematic diagram showing a structure of a driving system for a touch display device.
Figure 8:
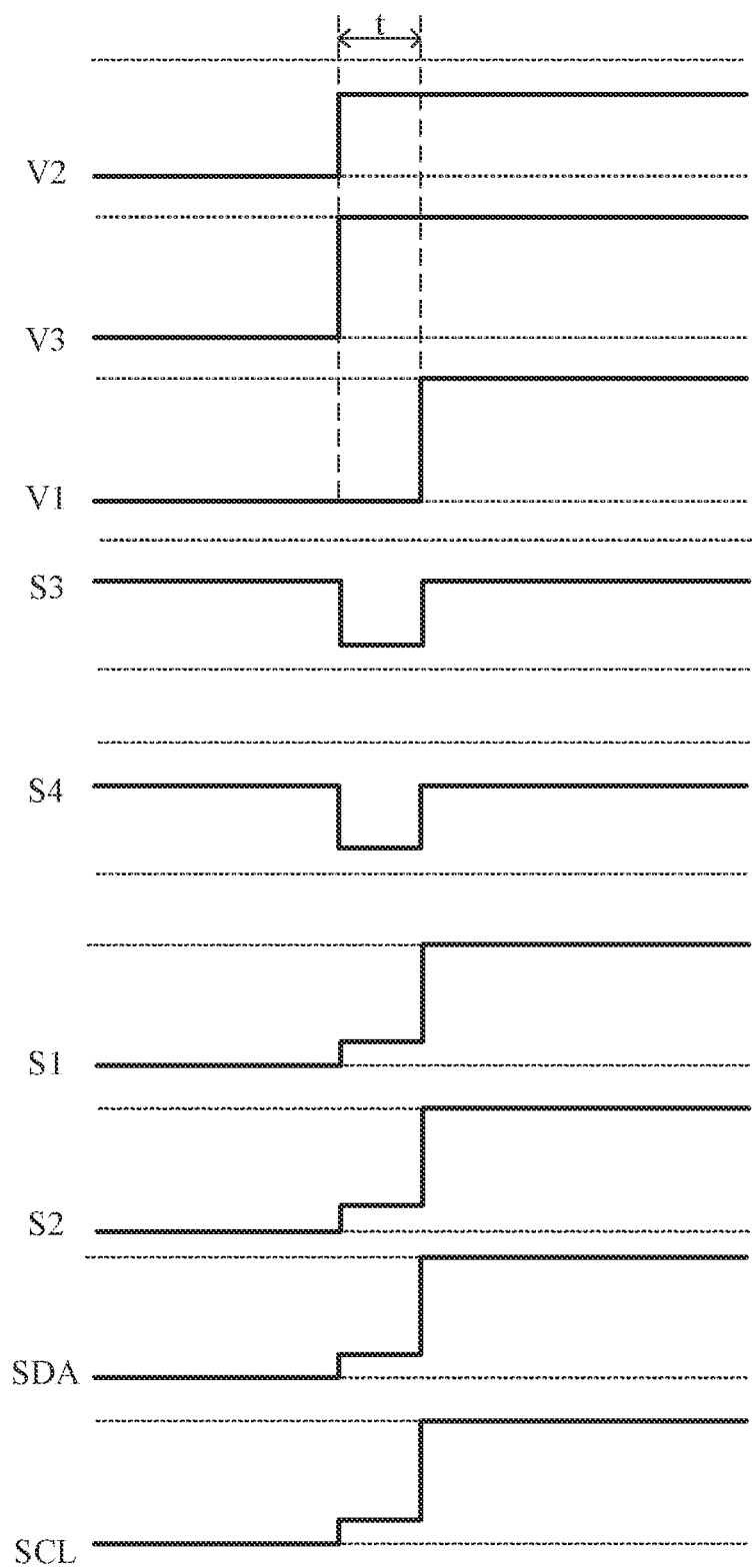
FIG. 8 is a timing diagram of signals for controlling the driving system in FIG. 6.

The related touch circuit 10 may have a structure shown in FIG. 6. As shown in FIG. 6, when the fourth transistor M4 is turned on, leakage currents from the third transistor M3 and the fourth transistor M4 will directly flow to the data signal port SDA of a touch IC through the data signal input terminal S1. In addition, when the sixth transistor M6 is turned on, leakage currents from the fifth transistor M5 and the sixth transistor M6 will directly flow to the clock signal port SCL of the touch IC through the clock signal input terminal S2. As a result, a voltage at the data signal port SDA and a voltage at the clock signal port SCL are increased (as shown in FIG. 8).

Figure 7:
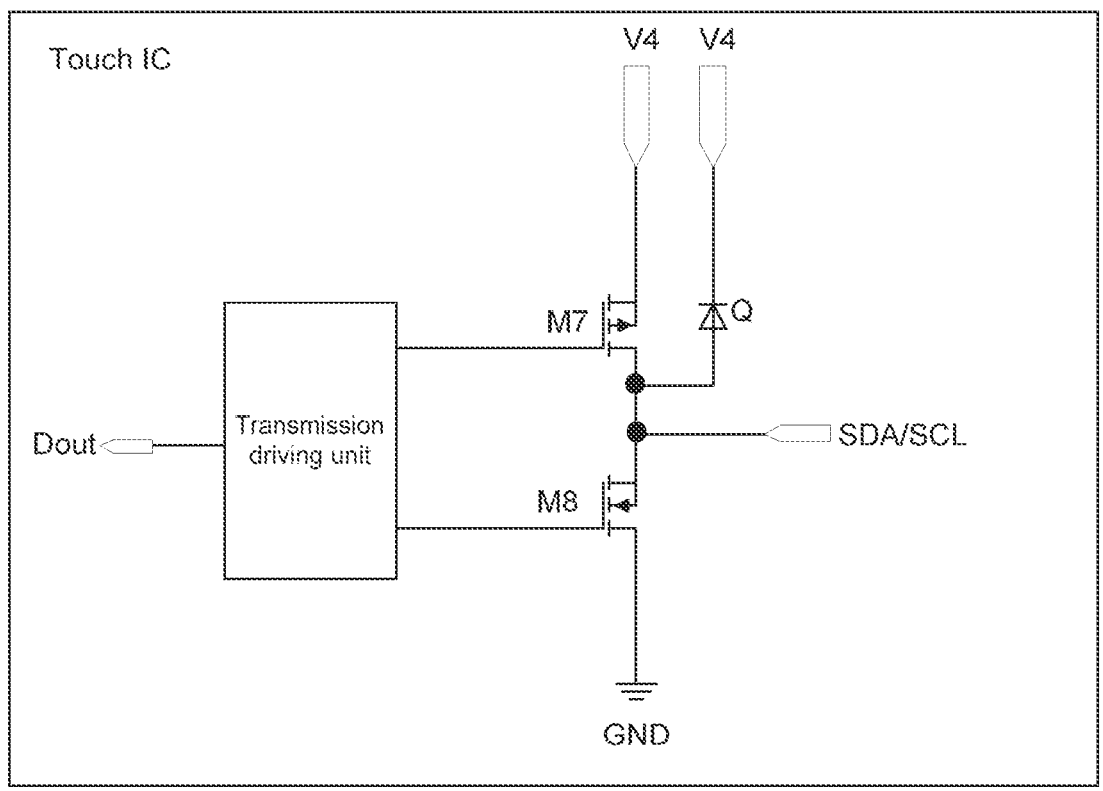
FIG. 7 is a schematic diagram showing a part of the touch IC in FIG. 6.

In some examples, an internal structure of the touch IC is as shown in FIG. 7, and the seventh transistor M7 is a P-type transistor. The power-up time of a fourth signal input terminal V4 is the same as the power-up time of the first signal input terminal V1.

When the second signal input terminal V2 and the third signal input terminal V3 is powered up, the first signal input terminal V1 and the fourth signal input terminal V4 have not yet been powered up. Therefore, the leakage currents directly flows to the data signal port SDA or the clock signal port SCL of the touch IC. In this case, the seventh transistor M7 is turned on, and a diode Q is turned on, that is, a portion of circuits inside the touch IC is turned on due to the leakage currents. However, at this time, remaining circuits in the touch IC (e.g., in FIG. 7, a transmission driving unit and an eighth transistor M8 that is an N-type transistor) have not been turned on, and thus the touch IC works abnormally. As a result, a signal transmission between the touch IC and a processor 20 is affected, and then communication between the display panel control circuit board 1 and the system motherboard 2 becomes abnormal. That is, the system motherboard 2 does not transmit I2C signals to the display panel control circuit board 1, and a touch function of the display panel fails.

In some embodiments of the present disclosure, if the first signal input terminal V1 is not powered up, the first transistor M1 and the second transistor M2 will not turned on. In this way, the leakage currents from the third transistor M3 and the fourth transistor M4 will not flow to the data signal port SDA of the touch IC, and the leakage currents from the fifth transistor M5 and the sixth transistor M6 will not flow to the clock signal port SOL of the touch IC. Therefore, it is possible to avoid a problem that the touch IC works abnormally, and it is also possible to avoid a problem that the communication between the display panel control circuit board 1 and the system motherboard 2 becomes abnormal, and a problem that the touch function of the display panel fails. At a moment when the notebook computer is turned on, the leakage currents generated by the system motherboard 2 will not flow to the display panel control circuit board 1, and the communication between the display panel control circuit board 1 and the system motherboard 2 may not be adversely affected. Therefore, the system motherboard 2 may normally transmit the I2C signals to the display panel control circuit board 1 thereby achieving a touch control of the display panel.

Figure 9:
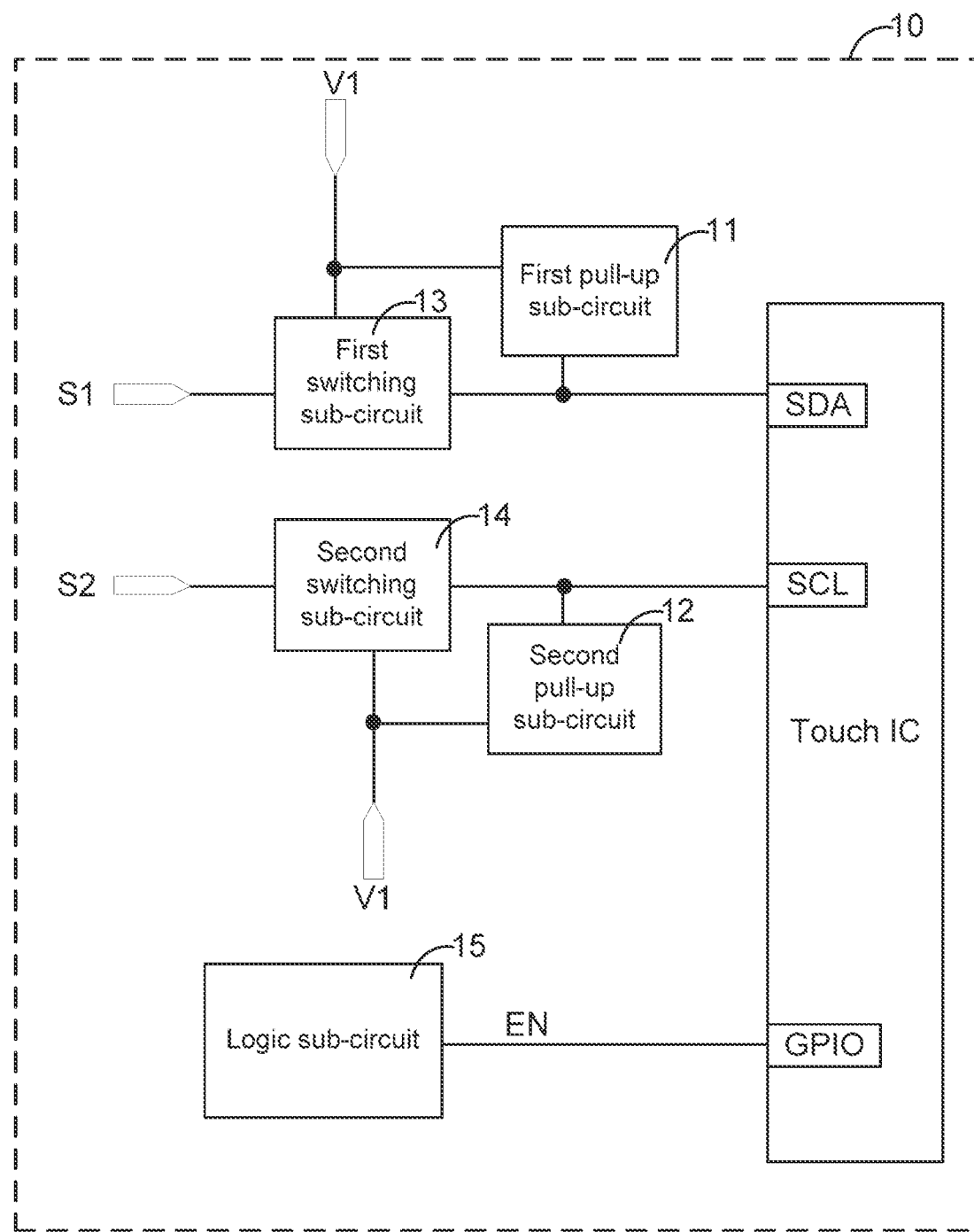
FIG. 9 is a schematic diagram showing a structure of another touch circuit, according to some embodiments.

In some embodiments, as shown in FIG. 9, the touch IC further includes a general purpose input/output port as a touch signal port GPIO. The touch circuit 10 further includes a logic sub-circuit 15 electrically connected to the touch signal port GPIO of the touch IC. The logic sub-circuit 15 is configured to output a touch enabling signal EN to the touch signal port GPIO of the touch IC in response to a touch operation of a user, so as to activate the touch signal port GPIO of the touch IC.

In a case where the touch circuit 10 has the structure shown in FIG. 9, the driving method of the touch circuit 10 may further include: outputting, by the logic sub-circuit 15, the touch enabling signal EN to the touch signal port GPIO of the touch IC in response to the touch operation of the user, so as to activate the touch signal port GPIO of the touch IC.

Figure 10:
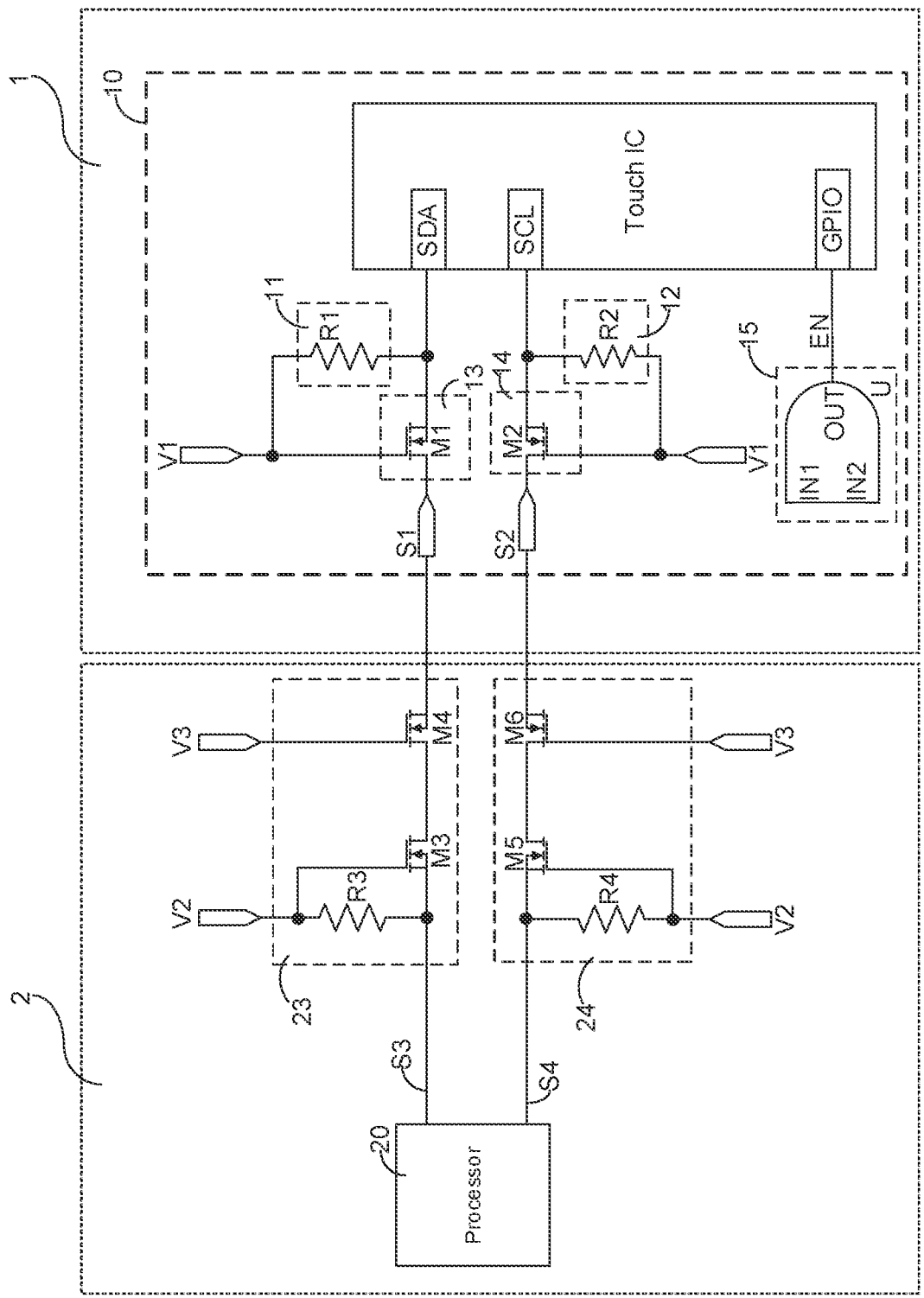
FIG. 10 is a schematic diagram showing a structure of yet another driving system for a touch display device, according to some embodiments.
Figure 11:
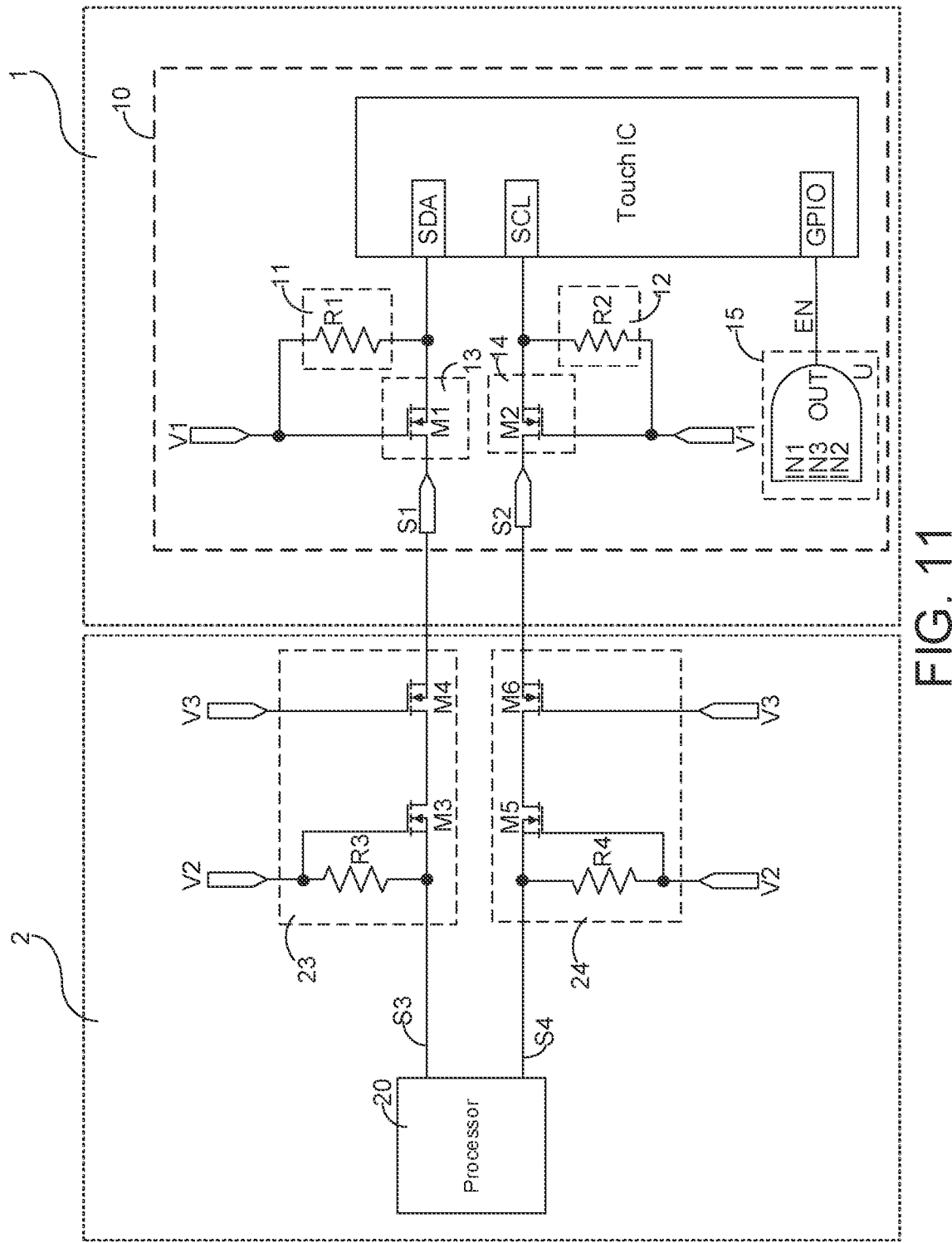
FIG. 11 is a schematic diagram showing a structure of yet another driving system for a touch display device, according to some embodiments.
Figure 12:
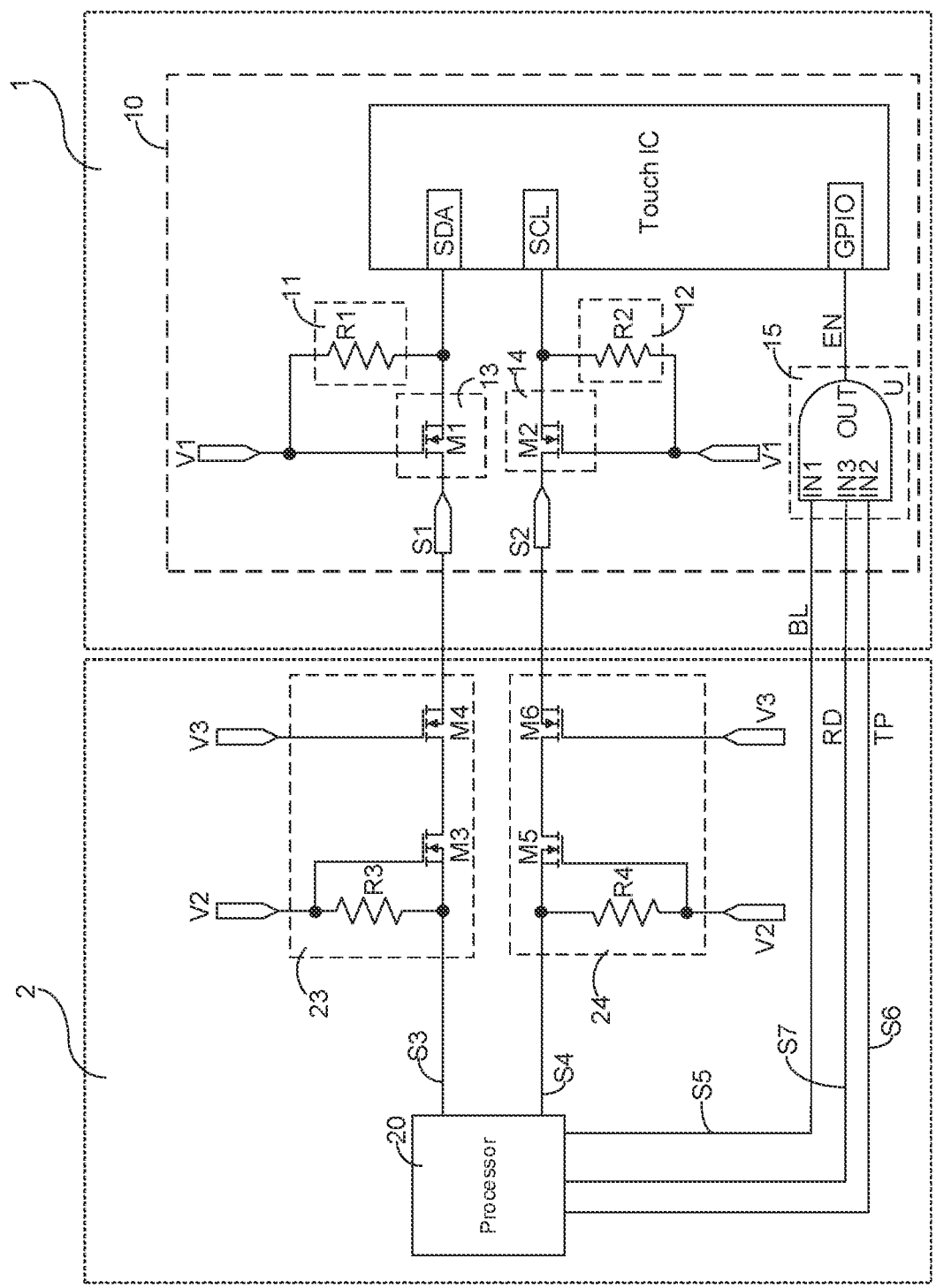
FIG. 12 is a schematic diagram showing a structure of yet another driving system for a touch display device, according to some embodiments.
Figure 13:
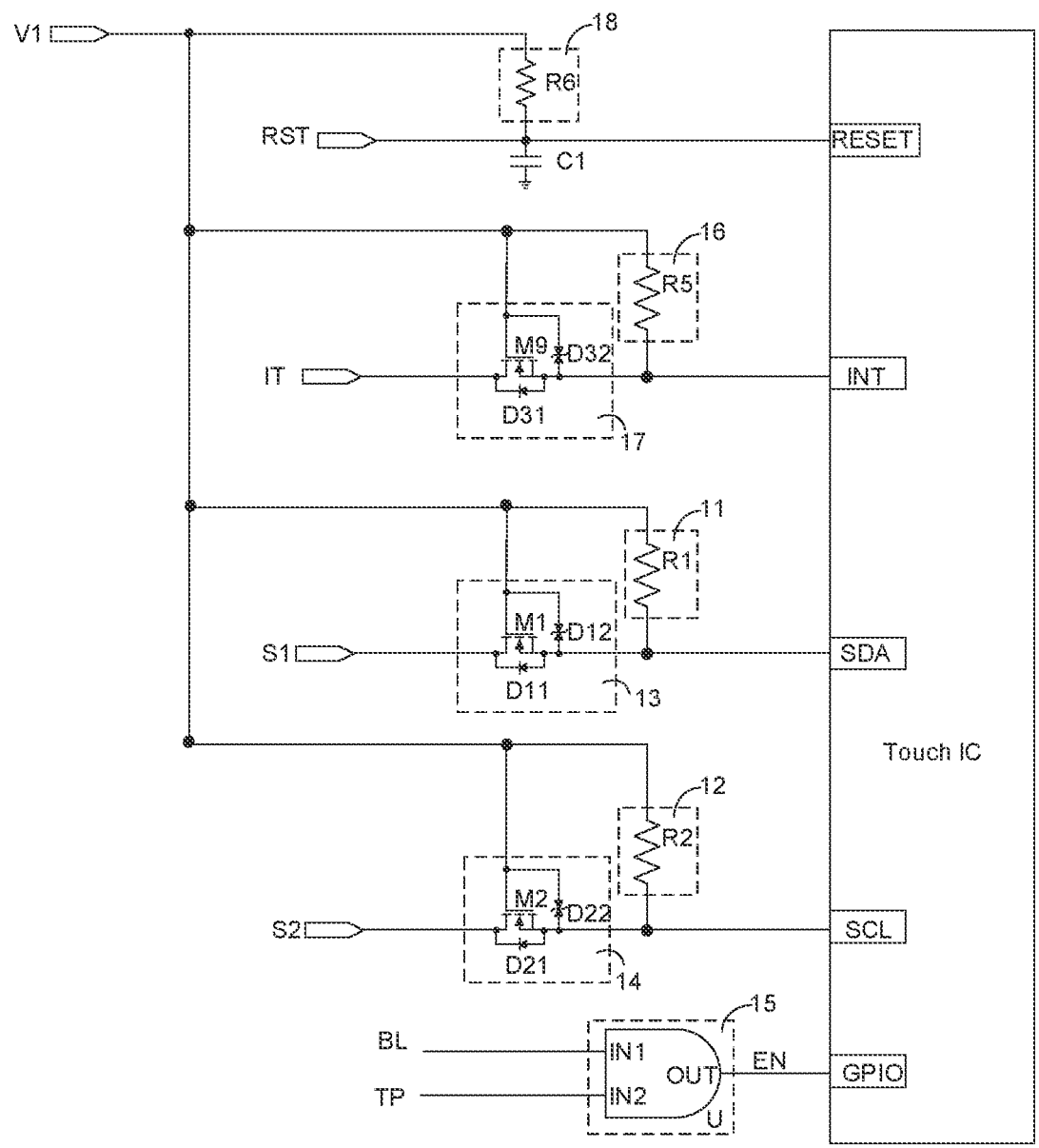
FIG. 13 is a schematic diagram showing a structure of yet another touch circuit, according to some embodiments.

In some embodiments, as shown in FIGS. 10 to 13, the logic sub-circuit 15 includes an AND gate U. In some examples, as shown in FIGS. 10 and 13, the AND gate U includes a first input terminal IN1, a second input terminal IN2 and an output terminal OUT. The AND gate U is configured to output the touch enabling signal EN through the output terminal OUT electrically connected to the touch signal port GPIO in response to receiving one of a backlight turn-on signal BL and a screen turn-on signal RD through the first input terminal IN1, and a touch generation signal TP through the second input terminal IN2.

In some examples, as shown in FIG. 12, the first input terminal IN1 is electrically connected to the processor 20 through a first signal line S5, and the second input terminal IN2 is electrically connected to the processor 20 through a second signal line S6. The backlight turn-on signal BL, the screen turn-on signal RD and the touch generation signal TP are from the processor 20.

In a case where the logic sub-circuit 15 has the structure shown in FIG. 10, in the driving method of the touch circuit 10, the step of outputting, by the logic sub-circuit 15, the touch enabling signal EN in response to the touch operation of the user, includes: outputting, by the AND gate U, the touch enabling signal EN through the output terminal OUT in response to receiving the touch generation signal TP through the second input terminal IN2 and one of the backlight turn-on signal BL and the screen turn-on signal RD through the first input terminal IN1.

It will be noted that, when a touch operation is performed on a display panel, the touch IC sends a touch interrupt signal to the processor 20 of the system motherboard 2 in response to the touch operation, and the processor 20 may generate and output the touch generation signal TP to the touch IC in response to the triggered touch interrupt signal.

In some embodiments, referring to FIG. 13, the touch IC further includes a touch interrupt signal port INT. The touch IC outputs the touch interrupt signal from the touch interrupt signal port INT in response to the touch operation.

The touch circuit 10 further includes a third switching sub-circuit 17 and a third pull-up sub-circuit 16. The third pull-up sub-circuit 16 is electrically connected to the first signal input terminal V1 and the touch interrupt signal port INT of the touch IC. The third pull-up sub-circuit 16 is configured to transmit the signal from the first signal input terminal V1 to the touch interrupt signal port INT, so as to activate the touch interrupt signal port INT. The third switching sub-circuit 17 is electrically connected to the first signal input terminal V1, the touch interrupt signal port INT of the touch IC and a touch interrupt signal terminal IT. The third switching sub-circuit 17 is configured to transmit the touch interrupt signal output from the touch interrupt signal port INT of the touch IC to the processor 20 of the system motherboard 2 through the touch interrupt signal terminal IT, under the control of the signal from the first signal input terminal V1.

In some examples, as shown in FIG. 13, the third pull-up sub-circuit 16 includes a fifth pull-up resistor R5. A first electrode of the fifth pull-up resistor R5 is electrically connected to the first signal input terminal V1, and a second electrode of the fifth pull-up resistor R5 is electrically connected to the touch interrupt signal port INT of the touch IC.

In some examples, as shown in FIG. 13, the third switching sub-circuit 17 includes a ninth transistor M9. A gate of the ninth transistor M9 is electrically connected to the first signal input terminal, a first electrode of the ninth transistor M9 is electrically connected to the touch interrupt signal port INT of the touch IC, and a second electrode of the ninth transistor M9 is electrically connected to the touch interrupt signal terminal IT.

It will be noted that the type of the ninth transistor M9 is not limited herein, which can be set according to actual needs. For example, the types of the ninth transistor M9, the first transistor M1 and the second transistor M2 are the same.

For example, as shown in FIG. 13, the third switching sub-circuit 17 further includes a third unidirectional diode D31 and a third bidirectional diode D32. A first electrode of the third unidirectional diode D31 is electrically connected to the first electrode of the ninth transistor M9, and a second electrode of the third unidirectional diode D31 is electrically connected to the second electrode of the ninth transistor M9. That is, the first electrode of the third unidirectional diode D31 is electrically connected to the touch interrupt signal port INT of the touch IC, and the second electrode of the third unidirectional diode D31 is electrically connected to the touch interrupt signal terminal IT. A first electrode of the third bidirectional diode D32 is electrically connected to the gate of the ninth transistor M9, and a second electrode of the third bidirectional diode D32 is electrically connected to the first electrode of the ninth transistor M9. That is, the first electrode of the third bidirectional diode D32 is electrically connected to the first signal input terminal V1, and the second electrode of the third bidirectional diode D32 is electrically connected to the touch interrupt signal port INT of the touch IC.

In some examples, as shown in FIG. 13, the first switching circuit 13 includes a first transistor M1, a first unidirectional diode D11 and a first bidirectional diode D12. A gate of the first transistor M1 is electrically connected to the first signal input terminal V1, a first electrode of the first transistor M1 is electrically connected to the data signal port SDA of the touch IC, and a second electrode of the first transistor M1 is electrically connected to the data signal input terminal S1. A first electrode of the first unidirectional diode D11 is electrically connected to the first electrode of the first transistor M1, and a second electrode of the first unidirectional diode D11 is electrically connected to the second electrode of the first transistor M1. That is, the first electrode of the first unidirectional diode D11 is electrically connected to the data signal port SDA of the touch IC, and the second electrode of the first unidirectional diode D11 is electrically connected to the data signal input terminal S1. A first electrode of the first bidirectional diode D12 is electrically connected to the date of the first transistor M1, and a second electrode of the first bidirectional diode D12 is electrically connected to the first electrode of the first transistor M1. That is, the first electrode of the first bidirectional diode D12 is electrically connected to the first signal input terminal V1, and the second electrode of the first bidirectional diode D12 is electrically connected to the data signal port SDA of the touch IC.

In some examples, as shown in FIG. 13, the second switching sub-circuit 14 includes a second transistor M2, a second unidirectional diode D21 and a second bidirectional diode D22. A gate of the second transistor M2 is electrically connected to the first signal input terminal V1, a first electrode of the second transistor M2 is electrically connected to the clock signal port SCL, of the touch IC, and a second electrode of the second transistor M2 is electrically connected to the clock signal input terminal S2. A first electrode of the second unidirectional diode D21 is electrically connected to the first electrode of the second transistor M2, and a second electrode of the second unidirectional diode D21 is electrically connected to the second electrode of the second transistor M2. That is, the first electrode of the second unidirectional diode D21 is electrically connected to the dock signal port SCL of the touch IC, and the second electrode of the second unidirectional diode D21 is electrically connected to the dock signal input terminal S2. A first electrode of the second bidirectional diode D22 is electrically connected to the gate of the second transistor M2, and a second electrode of the second bidirectional diode D22 is electrically connected to the first electrode of the second transistor M2. That is, the first electrode of the second bidirectional diode D22 is electrically connected to the first signal input terminal V1, and the second electrode of the second bidirectional diode D22 is electrically connected to the clock signal port SOL of the touch IC.

In addition, as shown in FIG. 13, the touch IC further includes a reset port RESET. The reset port RESET of the touch IC is electrically connected to a reset signal terminal RST. The touch IC is configured to be reset in response to receiving a reset signal from the reset signal terminal RST through the reset port RESET. For example, the reset signal is provided by the system motherboard 2, and the reset signal terminal RST is electrically connected to the system motherboard 2 (e.g., the processor 20 of the system motherboard 2).

In some examples, as shown in FIG. 13, the touch circuit 10 further includes a fourth pull-up sub-circuit 18 electrically connected to the first signal input terminal V1 and the reset port RESET of the touch IC. The fourth pull-up sub-circuit 18 is configured to transmit the signal from the first signal input terminal V1 to the reset port RESET, so as to activate the reset port RESET.

For example, as shown in FIG. 13, the fourth pull-up sub-circuit 18 includes a sixth pull-up resistor R6. A first electrode of the sixth pull-up resistor R6 is electrically connected to the first signal input terminal V1, and a second electrode of the sixth pull-up resistor R6 is electrically connected to the reset port RESET.

In addition, as shown in FIG. 13, the touch circuit 10 further includes a first capacitor C1. A first electrode of the first capacitor C1 is electrically connected to the reset signal terminal RST, and a second electrode of the first capacitor C1 is grounded. The first capacitor C1 is configured to store the reset signal from the reset signal terminal RST, so as to maintain stability of the reset signal received by the reset port RESET of the touch IC.

For example, the display panel of the touch display device is an active light-emitting display panel, such as an organic light-emitting diode (OLED) display panel. As shown in FIG. 10, the display panel is in a bright state under control of the screen turn-on signal RD, and then the touch display device is in a normal working state.

The related touch circuit 10 may have the structure shown in FIG. 6, in which the touch IC directly receives the touch generation signal TP. For example, the touch display device is a notebook computer, when the notebook computer is closed, the notebook computer is in a sleep state. In this case, once the keyboard contacts the screen, the processor 20 may output a touch generation signal TP to the touch IC, and then the touch IC prepares to perform the touch function according to the received touch generation signal TP. However, the notebook computer is in the sleep state, that is, some circuit components inside the touch IC have not been turned on. Therefore, the touch IC cannot operate normally, and the touch function fails.

In some embodiments of the present disclosure, the AND gate U is configured to receive the touch generation signal TP and one (e.g., the backlight turn-on signal BL) of the backlight turn-on signal BL and the screen turn-on signal RD, and output the touch enabling signal EN to the touch IC. In this way, only in a case where the touch generation signal TP and one (e.g., the backlight turn-on signal BL) of the backlight turn-on signal BL and the screen turn-on signal RD are at a high level, i.e., only in a case where the display panel is in the bright state and the touch operation is performed on the display panel, may the touch enabling signal EN be output to the touch signal port GPIO of the touch IC by the AND gate U. The touch display device is in the normal working state when the display panel is in the bright state, that is, the circuit components inside the touch IC are in working states, after the touch enabling signal EN is transmitted to the touch IC, the touch IC may operate normally to achieve the touch control, thereby avoiding the failure of the touch function.

Figure 14:
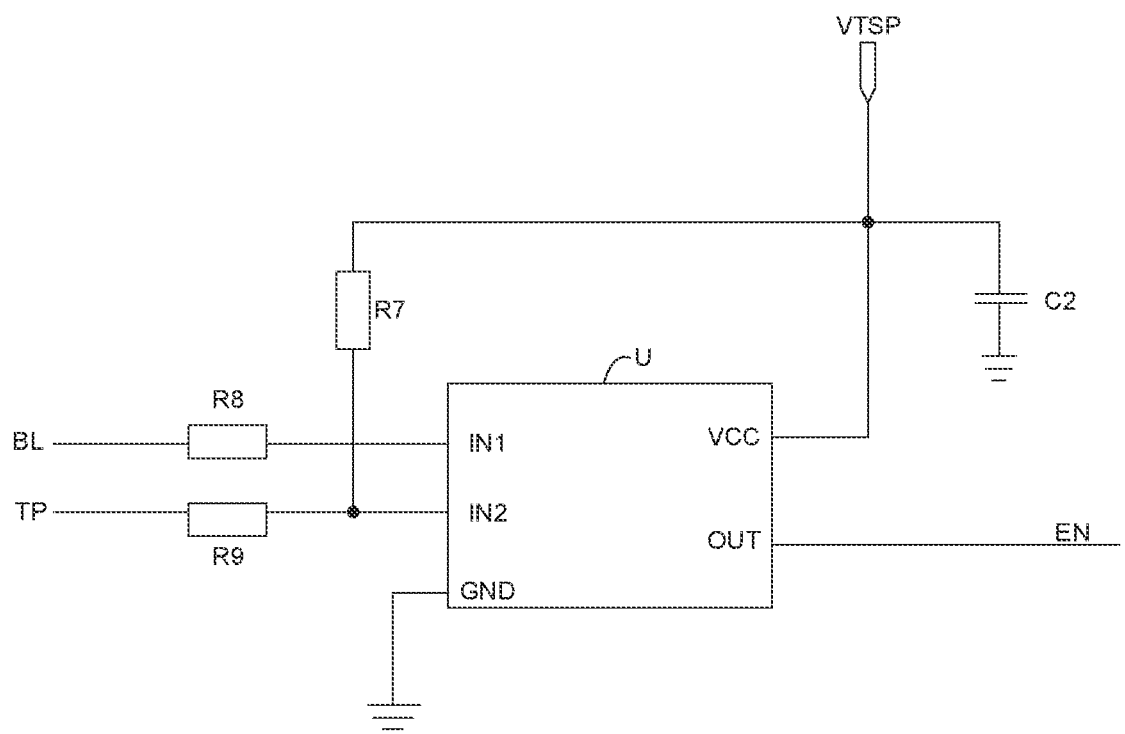
FIG. 14 is a schematic diagram showing a structure of a logic sub-circuit, according to some embodiments.

In some examples, as shown in FIG. 14, the AND gate U further includes a voltage port VCC and a grounding port GND. The grounding port GND is grounded, and the voltage port VCC is electrically connected to a control voltage terminal VTSP. The AND gate U is configured to receive a control voltage from the control voltage terminal VTSP through the voltage port VCC to power up the AND gate U.

In some examples, as shown in FIG. 14, the logic sub-circuit 15 further includes a second capacitor C2. A first electrode of the second capacitor C2 is electrically connected to the control voltage terminal VTSP, and a second electrode of the second capacitor C2 is grounded. The second capacitor C2 is configured to store the control voltage of the control voltage terminal VTSP, so as to maintain stability of the control voltage received by the voltage port VCC of the AND gate U.

In some examples, the control voltage of the control voltage terminal VTSP is a direct current voltage. For example, the control voltage of the control voltage terminal VTSP is the same as the voltage of the signal of the first signal input terminal V1, for example, the control voltage of the control voltage terminal VTSP and the voltage of the signal of the first signal input terminal V1 both are 3.3 V. In this case, the control voltage terminal VTSP and the first signal input terminal V1 are the same terminal. For another example, the control voltage (e.g., 5 V) of the control voltage terminal VTSP is greater than the voltage (e.g., 3.3 V) of the signal of the first signal input terminal V1. In this case, the control voltage terminal VTSP and the first signal input terminal V1 are different terminals.

In some examples, as shown in FIG. 14, the logic sub-circuit 15 further includes a first resistor R7. A first electrode of the first resistor R7 is electrically connected to the control voltage terminal VTSP, and a second electrode of the first resistor R7 is electrically connected to the second input terminal IN2 of the AND gate U. The first resistor R7 is configured to make the touch generation signal TP transmitted to the second input terminal IN2 of the AND gate U be maintained at a high level. For example, the first resistor R7 is a pull-up resistor.

In some examples, as shown in FIG. 14, the logic sub-circuit 15 further includes a second resistor R8 and a third resistor R9. A second electrode of the second resistor R8 is electrically connected to the first input terminal IN1 of the AND gate U, and a first electrode of the second resistor R8 is configured to receive one of the backlight turn-on signal BL and the screen turn-on signal RD. A second electrode of the third resistor R9 is electrically connected to the second input terminal IN2, and a first electrode of the third resistor R9 is configured to receive the touch generation signal TP. For example, each of the second resistor R8 and the third resistor R9 is a zero-ohm resistor.

For example, a resistance of the first pull-up resistor R1 is 1 KΩ; a resistance of the second pull-up resistor R2 is 11 KΩ; a resistance of the fifth pull-up resistor R5 is 4.7 KΩ; a resistance of the sixth pull-up resistor R6 is 51 KΩ; a resistance of the first resistor R7 is 47 KΩ; a capacitance of the first capacitor C1 is 470 nF; and a capacitance of the second capacitor C2 is 100 nF.

In some examples, as shown in FIG. 11, the AND gate U includes a first input terminal IN1, a second input terminal IN2, an output terminal OUT, and a third input terminal IN3. The AND gate U is configured to output the touch enabling signal EN through the output terminal OUT electrically connected to the touch signal port GPIO in response to receiving one (e.g., the backlight turn-on signal BL) of the backlight turn-on signal BL and the screen turn-on signal RD through the first input terminal IN1, the touch generation signal TP through the second input terminal IN2, and another (e.g., the screen turn-on signal RD) of the backlight turn-on signal BL and the screen turn-on signal RD through the third input terminal IN3.

In some examples, as shown in FIG. 12, the first input terminal IN1 is electrically connected to the processor 20 through the first signal line 35, the second input terminal IN2 is electrically connected to the processor 20 through the second signal line 36, and the third input terminal IN3 is electrically connected to the processor 20 through a third signal line ST The screen turn-on signal RD, the touch generation signal TP and the backlight turn-on signal BL are all from the processor 20.

It will be noted that the touch display device may include one or more additional integrated circuits. The screen turn-on signal RD, the touch generation signal TP and the backlight turn-on signal BL may be provided by the same integrated circuit, or may be provided by different integrated circuits, which is not limited thereto.

In a case where the logic sub-circuit 15 has the structure shown in FIG. 11, in the driving method of the touch circuit 10, the step of outputting, by the logic sub-circuit 15, the touch enabling signal EN in response to the touch operation of the user, may include: outputting, by the AND gate U, the touch enabling signal EN through the output terminal OUT in response to receiving the touch generation signal TP through the second input terminal IN2, one (e.g., the backlight turn-on signal BL) of the backlight turn-on signal BL and the screen turn-on signal RD through the first input terminal IN1, and another (e.g., the screen turn-on signal RD) of the backlight turn-on signal BL and the screen turn-on signal RD through the third input terminal IN3.

For example, the display panel of the touch display device is a passive light-emitting display panel, such as a liquid crystal display (LCD) panel. As shown in FIGS. 11 and 12, the display panel is in the bright state under control of both the screen turn-on signal RD and the backlight turn-on signal BL, and then the touch display device is in the normal working state, In order to describe responses of the touch circuit in some embodiments shown in FIGS. 11 and 12 to touch operations under different conditions more clearly, the touch circuit 10 is compared with the touch circuit shown in FIG. 6 below, and comparison results are listed in Table 1.

TABLE 1

|  | Touch generation signal TP | Screen turn-on signal RD | Backlight turn-on signal BL | Whether the touch signal port GPIO is activated |
|---|---|---|---|---|
| Touch circuit 10 in FIG. 6 | High level |  |  | Activated |
|  | Low level |  |  | Failed |
| Touch circuit 10 in FIG. 12 | High level | High level | High level | Activated |
|  | High level | High level | Low level | Failed |
|  | High level | Low level | High level |  |
|  | Low level | High level | High level |  |
|  | Low level | Low level | High level |  |
|  | Low level | High level | High level |  |
|  | High level | Low level | Low level |  |
|  | Low level | Low level | Low level |  |

It will be seen that, with respect to the touch circuit 10 in FIG. 6, the touch signal port GPIO of the touch IC is activated as long as the touch generation signal TP is at a high level. In this case, the touch display device may be in the sleep state, and touch failure may occur.

With respect to the touch circuit 10 in FIGS. 11 and 12, only in a case where the backlight turn-on signal BL, the touch generation signal TP and the screen turn-on signal RD are all at a high level, may the touch enabling signal EN be output to the touch signal port GPIO of the touch IC by the AND gate U, so as to activate the touch signal port GPIO. In this case, the touch display device is in the normal working state, the circuit components inside the touch IC all have been in the working state, and thus the touch failure may be avoided.

In order to describe responses of the touch circuit in some embodiments shown in FIGS. 10 and 13 to touch operations under different conditions more clearly, the touch circuit 10 is compared with the touch circuit shown in FIG. 6 below, and comparison results are listed in Table 2.

TABLE 2

|  | Touch generation signal TP | Backlight turn-on signal BL | Whether the touch signal port GPIO is activated |
|---|---|---|---|
| Touch circuit 10 in FIG. 6 | High level |  | Activated |
|  | Low level |  | Failed |
| Touch circuit 10 in FIG. 13 | High level | High level | Activated |
|  | High level | Low level | Failed |
|  | Low level | High level |  |
|  | Low level | Low level |  |

It will be seen that, with respect to the touch circuit 10 in FIG. 6, the touch signal port GPIO of the touch IC is activated as long as the touch generation signal TP is at a high level. In this case, the touch display device may be in the sleep state, and touch failure may occur. With respect to the touch circuit 10 in FIGS. 10 and 13, only in a case where the backlight turn-on signal BL and the touch generation signal TP are all at a high level, may the touch enabling signal EN be output to the touch signal port GPIO of the touch IC by the AND gate U, so as to activate the touch signal port GPIO. In this case, the touch display device is in the normal working state, the circuit components inside the touch IC all have been in the working state, and thus the touch failure may be avoided.

In the description of the above embodiments, specific features, structures, materials or characteristics may be combined in a suitable manner in any one or more embodiments or examples.

The forgoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A touch circuit, comprising:
a touch IC including a touch signal port; and
a logic sub-circuit electrically connected to the touch signal port, and being configured to output a touch enabling signal to the touch signal port; wherein
the logic sub-circuit includes an AND gate, the AND gate includes a first input terminal, a second input terminal and an output terminal electrically connected to the touch signal port; and the AND gate is configured to output the touch enabling signal through the output terminal electrically connected to the touch signal port in response to receiving one of a backlight turn-on signal and a screen turn-on signal through the first input terminal, and a touch generation signal through the second input terminal.

2. The touch circuit according to claim 1, wherein the AND gate further includes a third input terminal; wherein the AND gate is configured to output the touch enabling signal through the output terminal electrically connected to the touch signal port in response to receiving one of the backlight turn-on signal and the screen turn-on signal through the first input terminal, the touch generation signal through the second input terminal, and another of the backlight turn-on signal and the screen turn-on signal through the third input terminal.

3. The touch circuit according to claim 1, wherein the logic sub-circuit further includes a first resistor; a first electrode of the first resistor is configured to receive a control voltage, and a second electrode of the first resistor is electrically connected to the second input terminal of the AND gate.

4. The touch circuit according to claim 1, wherein the logic sub-circuit further includes:
a second resistor, wherein a first electrode of the second resistor is configured to receive one of the backlight turn-on signal and the screen turn-on signal, and a second electrode of the second resistor is electrically connected to the first input terminal of the AND gate; and
a third resistor, wherein a first electrode of the third resistor is configured to receive the touch generation signal, and a second electrode of the third resistor is electrically connected to the second input terminal of the AND gate.

5. The touch circuit according to claim 1, wherein the touch IC further includes a data signal port and a clock signal port; the touch circuit further comprises:
a first switching sub-circuit electrically connected to the data signal port, a first signal input terminal and a data signal input terminal, wherein the first switching sub-circuit is configured to transmit a signal from the data signal input terminal to the data signal port under control of the signal from the first signal input terminal; and
a second switching sub-circuit electrically connected to the clock signal port, the first signal input terminal and a clock signal input terminal, wherein the second switching sub-circuit is configured to transmit a signal from the clock signal input terminal to the clock signal port under control of the signal from the first signal input terminal.

6. The touch circuit according to claim 5, wherein the first switching sub-circuit includes a first transistor, wherein
a gate of the first transistor is electrically connected to the first signal input terminal, a first electrode of the first transistor is electrically connected to the data signal port, and a second electrode of the first transistor is electrically connected to the data signal input terminal.

7. The touch circuit according to claim 5, wherein the second switching sub-circuit includes a second transistor; wherein
a gate of the second transistor is electrically connected to the first signal input terminal, a first electrode of the second transistor is electrically connected to the clock signal port, and a second electrode of the second transistor is electrically connected to the clock signal input terminal.

8. The touch circuit according to claim 1, wherein the touch IC further includes a data signal port and a clock signal port; the touch circuit further comprises:
a first pull-up sub-circuit electrically connected to a first signal input terminal and the data signal port, wherein the first pull-up sub-circuit is configured to transmit a signal from the first signal input terminal to the data signal port; and
a second pull-up sub-circuit electrically connected to the first signal input terminal and the clock signal port, wherein the second pull-up sub-circuit is configured to transmit the signal from the first signal input terminal to the clock signal port.

9. The touch circuit according to claim 8, wherein the first pull-up sub-circuit includes a first pull-up resistor, wherein
a first electrode of the first pull-up resistor is electrically connected to the first signal input terminal, and a second electrode of the first pull-up resistor is electrically connected to the data signal port of the touch IC.

10. The touch circuit according to claim 8, wherein the second pull-up sub-circuit includes a second pull-up resistor, wherein
a first electrode of the second pull-up resistor is electrically connected to the first signal input terminal, and a second electrode of the second pull-up resistor is electrically connected to the clock signal port.

11. A driving method of a touch circuit, the touch circuit being the touch circuit according to claim 1, the driving method comprising:
outputting, by the logic sub-circuit, the touch enabling signal to the touch signal port in response to a touch operation, so as to activate the touch signal port, wherein
outputting, by the logic sub-circuit, the touch enabling signal in response to the touch operation includes:
outputting, by the AND gate, the touch enabling signal through the output terminal in response to receiving the touch generation signal through the second input terminal, and one of the backlight turn-on signal and the screen turn-on signal through the first input terminal.

12. The driving method according to claim 11, wherein the AND gate further includes a third input terminal; and outputting, by the logic sub-circuit, the touch enabling signal in response to the touch operation includes:
outputting, by the AND gate, the touch enabling signal through the output terminal in response to receiving the touch generation signal through the second input terminal, one of the backlight turn-on signal and the screen turn-on signal through the first input terminal, and another of the backlight turn-on signal and the screen turn-on signal through the third input terminal.

13. The driving method according to claim 11, wherein the touch IC includes a data signal port and a clock signal port; the touch circuit includes a first switching sub-circuit and a second switching sub-circuit; the first switching sub-circuit is electrically connected to the data port, a first signal input terminal and a data signal input terminal; the second switching sub-circuit is electrically connected to the clock signal port, the first signal input terminal and a clock signal input terminal; and the driving method further comprises:
receiving, by the first signal input terminal, a signal;
transmitting, by the first switching sub-circuit, a signal from the data signal input terminal to the data signal port under control of the signal from the first signal input terminal; and transmitting, by the second switching sub-circuit, a signal from the clock signal input terminal to the clock signal port under control of the signal from the first signal input terminal.

14. The driving method according to claim 11, wherein the touch IC further includes a data signal port and a clock signal port; the touch circuit further includes a first pull-up sub-circuit electrically connected to a first signal input terminal and the data signal port, and a second pull-up sub-circuit electrically connected to the first signal input terminal and the clock signal port; and the driving method further comprises:

receiving, by the first signal input terminal, a signal;

transmitting, by the first pull-up sub-circuit, the signal from the first signal input terminal to the data signal port, so as to activate the data signal port; and transmitting, by the second pull-up sub-circuit, the signal from the first signal input terminal to the clock signal port, so as to activate the clock signal port.

15. A driving system for a touch display device, the driving system comprising:

a display panel control circuit board including a touch circuit, wherein the touch circuit includes a touch IC and a logic sub-circuit, the touch IC includes a touch signal port, and the logic sub-circuit includes an AND gate; and a system motherboard including a processor, wherein a first input terminal of the AND gate is electrically connected to the processor through a first signal line, a second input terminal of the AND gate is electrically connected to the processor through a second signal line, and an output terminal of the AND gate is connected to the touch signal port of the touch IC;

the processor is configured to output one of a backlight turn-on signal and a screen turn-on signal to the first input terminal of the AND gate through the first signal line, and output a touch generation signal to the second input terminal of the AND gate through the second signal line; and the AND gate is configured to output the touch enabling signal through the output terminal electrically connected to the touch signal port of the touch IC in response to receiving one of the backlight turn-on signal and the screen turn-on signal through the first input terminal, and the touch generation signal through the second input terminal.

16. The driving system according to claim 15, wherein the AND gate further includes a third input terminal electrically connected to the processor through a third signal line;

the processor is configured to output another of the the backlight turn-on signal and the screen turn-on signal to the third input terminal of the AND gate through the third signal line; and the AND gate is configured to output the touch enabling signal through the output terminal electrically connected to the touch signal port in response to receiving one of the backlight turn-on signal and the screen turn-on signal through the first input terminal, the touch generation signal through the second input terminal, and another of the backlight turn-on signal and the screen turn-on signal through the third input terminal.

17. The driving system according to claim 15, wherein the touch circuit further includes a first switching sub-circuit electrically connected to the touch IC and a data signal input terminal, and a second switching sub-circuit electrically connected to the touch IC and a clock signal input terminal; and the processor is electrically connected to the data signal input terminal through a data signal line, and is electrically connected to the clock signal input terminal through a clock signal line; and the processor is configured to output a data signal to the first switching sub-circuit in the touch circuit through the data signal line, so that the first switching sub-circuit transmits the data signal to the touch IC; and output a clock signal to the second switching sub-circuit through the clock signal line, so that the second switching sub-circuit transmits the clock signal to the touch IC.

18. The driving system according to claim 15, wherein the system motherboard further includes a first level shift sub-circuit and a second level shift sub-circuit, wherein the first level shift sub-circuit is electrically connected to the data signal line, a second signal input terminal, a third signal input terminal and the data signal input terminal of the touch circuit;

the first level shift sub-circuit is configured to transmit a signal from the data signal line to the data signal input terminal of the touch circuit under control of both a signal from the second signal input terminal and a signal from the third signal input terminal, and the first level shift sub-circuit is configured to receive a signal from the first switching sub-circuit in the touch circuit;

the second level shift sub-circuit is electrically connected to the clock signal line, the second signal input terminal, the third signal input terminal and the clock signal input terminal of the touch circuit; and the second level shift sub-circuit is configured to transmit a signal from the clock signal line to the clock signal input terminal of the touch circuit under control of both the signal from the second signal input terminal and the signal from the third signal input terminal, and the second level shift sub-circuit is configured to receive a signal from the second switching sub-circuit in the touch circuit.

19. The driving system according to claim 18, wherein the first level shift sub-circuit includes a third pull-up resistor, a third transistor and a fourth transistor, wherein a first electrode of the third pull-up resistor is electrically connected to the second signal input terminal, and a second electrode of the third pull-up resistor is electrically connected to the data signal line and a first electrode of the third transistor;

a gate of the third transistor is electrically connected to the second signal input terminal, and a second electrode of the third transistor is electrically connected to a second electrode of the fourth transistor; and a gate of the fourth transistor is electrically connected to the third signal input terminal, and a first electrode of the fourth transistor is electrically connected to the first switching sub-circuit in the touch circuit.

20. The driving system according to claim 18, wherein the second level shift sub-circuit includes a fourth pull-up resistor, a fifth transistor and a sixth transistor, wherein a first electrode of the fourth pull-up resistor is electrically connected to the second signal input terminal, and a second electrode of the fourth pull-up resistor is electrically connected to the clock signal line and a first electrode of the fifth transistor;

a gate of the fifth transistor is electrically connected to the second signal input terminal, and a second electrode of the fifth transistor is electrically connected to a second electrode of the sixth transistor; and a gate of the sixth transistor is electrically connected to the third signal input terminal, and a first electrode of the sixth transistor is electrically connected to the second switching sub-circuit in the touch circuit.

* * * * *